US006681235B2

(12) United States Patent
Uchino et al.

(10) Patent No.: US 6,681,235 B2
(45) Date of Patent: Jan. 20, 2004

(54) FREQUENCY SYNTHESIZER AND GAUSSIAN NOISE GENERATOR USING THE SAME

(75) Inventors: Masaharu Uchino, Aikawamachi (JP); Kazuhiko Ishibe, Samukawamachi (JP)

(73) Assignee: Anritsu Corporation, Tokyo (JP)

( * ) Notice: Subject to any disclaimer, the term of this patent is extended or adjusted under 35 U.S.C. 154(b) by 472 days.

(21) Appl. No.: 09/777,437

(22) Filed: Feb. 6, 2001

(65) Prior Publication Data

US 2001/0016863 A1 Aug. 23, 2001

(30) Foreign Application Priority Data

Feb. 10, 2000 (JP) ........................................ 2000-033493

(51) Int. Cl.[7] .................................................. G06F 1/02
(52) U.S. Cl. ...................................................... 708/271
(58) Field of Search ................................ 708/271–272; 327/105–107

(56) References Cited

U.S. PATENT DOCUMENTS

| 4,835,721 A |   | 5/1989 | Becker et al. |
|---|---|---|---|
| 5,179,348 A |   | 1/1993 | Thompson |
| 5,430,764 A |   | 7/1995 | Chren, Jr. |
| 6,307,441 B1 | * | 10/2001 | Sharpe .................... 327/106 |

FOREIGN PATENT DOCUMENTS

EP         0414445        2/1991

OTHER PUBLICATIONS

40th Annual Frequency Control Symposium, 1986; pp. 355–365, "A Short Survey of Frequency Synthesizer Techniques"; V. Reinhardt et al, Hughes Aircraft Company, Space and Communication Group.

Mark Kac "Statistical Independence in Probability Analysis and Number Theory". The Mathematical Association of America 1959, pp. 36–52.

* cited by examiner

*Primary Examiner*—Tan V. Mai
(74) *Attorney, Agent, or Firm*—Frishauf, Holtz, Goodman & Chick, P.C.

(57) ABSTRACT

An amplitude data generator receives L-bit data, and outputs amplitude data of a predetermined periodic function of a phase specified by the data. A frequency setter sets frequency data of (K+L-1) bits obtained by dividing a desired output frequency by a frequency of a predetermined clock signal. A K bit counter counts the clock signal. L-set product and sum computation circuits subject the frequency data of (K+L-1) bits into L-set K-bit data in which a start bit is shifted by one bit each other. Then, these circuits compute a logical product between the counter output of K bits from the counter and a bit unit, and obtains a total number of bits for each set when the computation result is 1. A shifting/adding circuit adds each total number data obtained by the L-set product and sum computation circuits by shifting a bit, and outputs the least significant L bits of the computation result to the amplitude data generator.

29 Claims, 11 Drawing Sheets

FREQUENCY SYNTHESIZER AND GAUSSIAN NOISE GENERATOR USING THE SAME

CROSS-REFERENCE TO RELATED APPLICATIONS

This application is based upon and claims the benefit of priority from the prior Japanese Patent Application No. 2000-033493 filed Feb. 10, 2000, the entire contents of which are incorporated herein by reference.

BACKGROUND OF THE INVENTION

The present invention relates to a frequency synthesizer and a Gaussian noise generator. In particular, the present invention relates to a frequency synthesizer having a high frequency resolution in a wide bandwidth and a Gaussian noise generator using the same.

Conventionally, a DDS (direct digital synthesizer) is used as a frequency synthesizer capable of generating a periodic function signal with its stable frequency.

FIG. 14 is a block diagram depicting a configuration of this DDS 10.

That is, in FIG. 14, in a waveform memory 11, amplitude data on a periodic function (for example, sine wave function) is stored by one cycle in a storage region that can be specified by an address signal of L bits.

This waveform memory 11 sequentially outputs amplitude data stored in an address specified by the address signal.

In addition, frequency setting means sets frequency data A for specifying an address interval (phase interval) in which amplitude data is read out from the waveform memory 11.

Further, an adder 13 adds the frequency data A set by the frequency setting means 12 and an output from a latch circuit 14, and the addition result thereof is outputted to the latch circuit 14.

This latch circuit 14 latches an output of the adder 13 every time the circuit receives a clock signal CK, and outputs this latch output as data for specifying a phase to the adder 13 and waveform memory 11.

Furthermore, a D/A converter 15 converts amplitude data outputted from the waveform memory 11 into an analog signal, and outputs the converted analog signal.

In the thus configured DDS 10, an address signal relevant to the waveform memory 11 increases with the intervals A like A, 2A, 3A, ... in synchronism with the clock signal CK.

In this manner, from the waveform memory 11, the amplitude data D (A), D (2A), D (3A), ... corresponding to each address are read out sequentially.

The amplitude data D (A), D (2A), D (3A), ... are converted into analog signals sequentially by means of the D/A converter 15, and are continuously outputted as a periodic function signal.

Here, assuming that bit number M of frequency data A set by the frequency setting means 12 is equal to bit number L of an address signal, an output frequency F is obtained as fc A/$2^L$. Thus, $2^L-1$ from fc·½$^L$ to fc·$2^{L-1}$/$2^L$ frequencies can be generated.

However, in this system, there is a problem that the setting resolution of a frequency that can be outputted is limited by bit number L of an address of the waveform memory 11.

Thus, in the DDS requiring a higher setting frequency, the frequency data A of M bits is composed of a L-bit integer portion and m-bit decimal number portion.

The adder 13 and the latch circuit 14 are configured so that L+m bit addition and latching are enabled, and upper L bits of an output of the L+m bits of the latch circuit 14 are outputted as an address signal to the waveform memory 11.

In this manner, a signal can be generated at a frequency resolution that is not limited by address bit number L of the address memory 11.

Using the above DDS 10, for example, when an attempt is made to generate a signal of an arbitrary frequency by defining an output (for example, 100 MHz) of a hydrogen maser oscillator of $10^{-15}$ in frequency precision as a reference clock signal CK, a frequency resolution of 16 digits or more is required for the DDS 10.

In this case, $\log_2 10^{16}$ is almost equal to $2^{54}$, and thus, it is required to use a binary adder of 54 bits as an adder 13.

However, if adding process with such many bits is performed, there is a problem that a delay time caused by a carry propagation process of the adder 13 exceeds a cycle of the clock signal CK, whereby practical use is not obtained.

That is, when the carry propagation delay time per bit of the adder 13 is defined as Ta, the maximum delay time of the entire adder 13 is obtained as (L-1) Ta.

This maximum delay time is required to be within a time shorter than a cycle 1/fc of a clock signal.

Hence, in the current adder, such adding process with many bits cannot be performed at a clock frequency (100 MHz). Therefore, there is a problem that an upper limit of a frequency that can be generated is forced to be reduced by reducing the clock frequency.

BRIEF SUMMARY OF THE INVENTION

The present invention has been made to solve the aforementioned problems. It is an object of the present invention to provide a frequency synthesizer capable of acquiring a high frequency resolution in a wide bandwidth and a Gaussian noise generator using the same.

In order to achieve the foregoing object, according to one aspect of the present invention, there is provided a frequency synthesizer comprising:

amplitude data output means for, when L-bit data is received, outputting amplitude data with a predetermined periodic function of a phase specified by the data;

frequency setting means for setting data of (K+L-1) bits obtained by dividing a desired output frequency by a frequency of a predetermined clock signal as frequency data;

a K-bit counter for counting the clock signal;

L-set product and sum computation circuits for subjecting frequency data of (K+L-1) bits from the frequency setting means into L-set K-bit data in which a start bit is shifted by one bit each other, and computing a logical product between a count output of K bits from the counter and a unit of bits, thereby obtaining a total number of bits in which the calculation result is 1 by each set; and a shifting/adding circuit for adding each total number data obtained by the L-set product and sum computation circuits, by shifting bits, and outputting the least significant L bits of the addition result to the amplitude data output means.

In addition, in order to achieve the foregoing object, according to another aspect of the present invention, there is provided a frequency synthesizer, comprising:

amplitude data output means for, when L-bit data is received, outputting amplitude data with a predetermined periodic function of a phase specified by the data;

frequency setting means for setting data of (K+L−1) bits obtained by dividing a desired output frequency by a frequency of a predetermined clock signal as frequency data;

a K-bit counter for counting the clock signal;

L-set product and sum computation circuits for subjecting frequency data of (K+L−1) bits from the frequency setting means into L-set K-bit data in which a start bit is shifted by one bit each other, and computing a logical product between a count output of K bits from the counter and a unit of bits, thereby obtaining a total number of bits in which the calculation result is 1 by each set;

a shifting/adding circuit for adding each total number data obtained by the L-set product and sum computation circuits by shifting bits, and outputting the least significant L bits of the addition result to the amplitude data output means;

a latch circuit for latching L-bit data inputted to the amplitude data output means every time the latch circuit receives a latch signal;

an adding circuit for adding an output of the shifting/adding circuit and an output of the latch circuit, and outputting the least significant L bits of the addition result to the amplitude data output means; and a control circuit for initializing the counter to a value 1 or a value close thereto every time frequency data set by the frequency setting means is changed, and outputting a latch signal to the latch circuit in accordance with a timing at which L-bit data corresponding to the initialized value is outputted from the shift adder, thereby substantially making continuous a phase value immediately before frequency change of amplitude data outputted from the amplitude data output means and a phase value immediately after frequency change.

Further, in order to achieve the foregoing object, according to a further aspect of the present invention, there is provided a Gaussian noise generator, comprising:

a sine wave generation portion for generating a plurality of sine waves having different frequencies; and a Gaussian noise generation portion for adding and synthesizing a plurality of sine waves generated by the sine wave generation portion, thereby generating a Gaussian noise signal, wherein the sine wave generation portion comprises:

amplitude data output means for receiving L-bit data, and outputting amplitude data of a sine wave function of a phase specified by the data;

frequency setting means for setting frequency data of (K+L−1) bits obtained by dividing a frequency selected from among geometrical series in which an 'u'-order algebraic integer relevant to an integer 'u' greater than the number of sine waves is defined as a common rate by a frequency of a predetermined clock signal as frequency data:

a K-bit counter for counting the clock signal;

L-set product and sum computation circuits for subjecting frequency data of (K+L−1) bits from the frequency setting means into L-set K-bit data in which a start bit is shifted by one bit each other, and computing a logical product between a count output of K bits from the counter and a unit of bits, thereby obtaining a total number of bits in which the calculation result is 1 by each set; and a shifting/adding circuit for adding each total number data obtained by the L-set product and sum computation circuits by shifting bits, and outputting the least significant L bits of the addition result to the amplitude data output means, the sine wave generation portion being constructed so as to generate sine waves of a plurality of frequencies selected without being duplicated from among a geometrical series in which the 'u'-order algebraic integer is defined as a common rate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
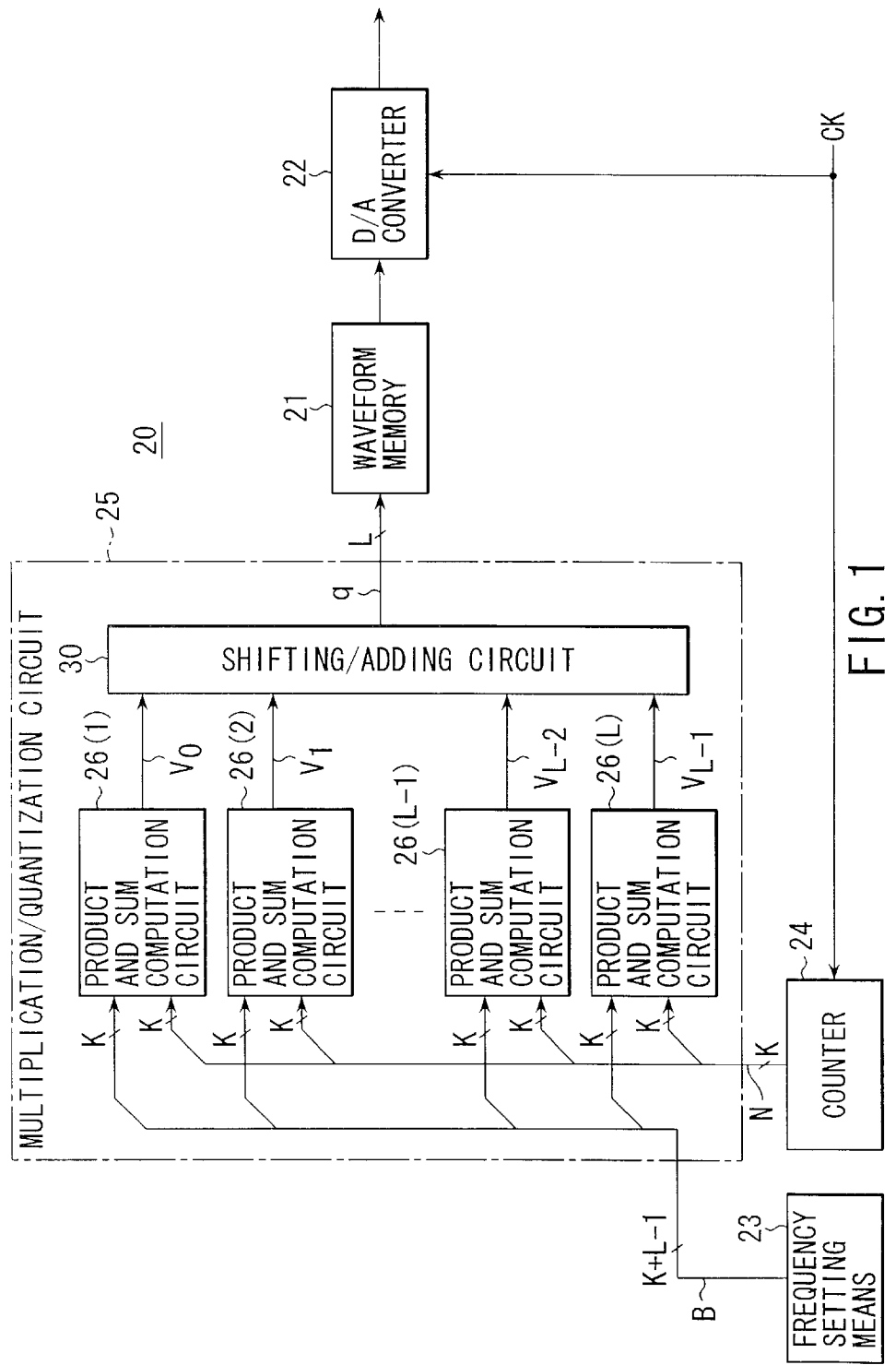
FIG. 1 is a block diagram depicting a configuration of a frequency synthesizer according to one embodiment of the present invention.

Reference will new be made in detail to the presently preferred embodiments of the invention as illustrated in the accompanying drawings, in which like reference numerals designate like or corresponding parts.

Hereinafter, embodiments of the present invention will be described with reference to the accompanying drawings.

FIG. 1 is a block diagram depicting a configuration of a frequency synthesizer according to one embodiment of the present invention.

In a waveform memory 21 serving as amplitude data output means of the frequency synthesizer 20 according to this embodiment, an arbitrary periodic frequency, for example, amplitude data of a sine wave function is stored in orders of addresses by one cycle in a region that can be specified by an L-bit address signal.

In this manner, the waveform memory 21 outputs amplitude data stored in an address (phase) specified by the address signal.

In addition, a D/A converter 22 sequentially converts the amplitude data outputted from the waveform memory 21 into an analog voltage signal, and outputs the converted signal.

In the case where an analog signal is not requested as a synthesizer output, the D/A converter 22 is omitted, and the amplitude data from the waveform data 21 may be used intact as a synthesizer output.

Further, the frequency setting means 23 sets to a multiplication/quantization circuit 25, the K+L−1 bit data obtained by a desired output frequency F by a frequency 'fc' of a clock signal CK (desired frequency data normalized at a clock frequency) as frequency data B.

Furthermore, the counter 24 is a K-bit binary counter for counting a clock signal CK that outputs a count output N of K bits to a multiplication/quantization circuit 25.

This multiplication/quantization circuit 25 performs multiplication between the count output N of K bits of the counter 24 and frequency data B of K+L−1 bits set from the frequency setting means 23, whereby the multiplication result is quantized to an L-bit address signal, and is outputted to the memory 21.

Now, the principle of multiplication quantizing caused by this multiplication/quantization circuit 25 will be described here.

When the count output N of k bits of the counter 24 is indicated by bit data, the following equation is established.

$$N = [n_0, n_1, n_2, \ldots, n_{K-2}, n_{K-1}] \text{MSB}$$

The value (sample number) is obtained as follows.

$$N = {}_{p=0}\Sigma^{K-1} (n_p\, 2^P)$$

wherein a sign ${}_{p=0}\Sigma^{K-1}$ indicates a sum from p=0 to p=K (this will be applied to the following description).

In addition, when frequency data B normalized at a clock frequency is indicated by bit data, the following equation is established.

$$B = [b_1, b_2, b_3, \ldots, b_{k+L-3}, b_{K+L-2}, b_{K+L-1}] \text{LSB}$$

The value is expressed in binary decimal notation as follows.

$$B = {}_{i=1}\Sigma^{K+L-1} (b_i\, 2^{-i})$$

Hence, a product Q between the frequency data B and the count output N is obtained as follows.

$$Q = {}_{p=0}\Sigma^{K-1} (n_p\, 2^P) \cdot {}_{i=1}\Sigma^{K+L-1} (b_i\, 2^{-i})$$

where a portion $2^P \cdot {}_{i=1}\Sigma K+L-1\, (b_i\, 2^{-i})$ can be expressed by a sum between an integer portion and a decimal number portion as follows.

$$i=0\,\Sigma^{p-1}\, (b_{p-i}\, 2^i) + i=1\,\Sigma K+L-1\, (b_{p+i}\, 2^{-i})$$

Therefore, the product Q is obtained as follows.

$$Q = \sum_{p=0}^{K-1} n_p \left[ \sum_{i=0}^{p-1} (b_{p-i} 2^i) + \sum_{i=1}^{K+L-1} (b_{p+i} 2^{-i}) \right] \quad (1)$$

$$= \left\{ \sum_{i=0}^{p-1} 2^i \sum_{p=0}^{K-1} n_p b_{p-i} \right\} + \left\{ \sum_{i=1}^{K+L-1} 2^{-i} \sum_{p=0}^{K-1} n_p b_{p+i} \right\}$$

where a first term of the above formula (1) is an unwanted integer term (overflow component). When this unwanted integer term is expressed by a formula including an integer term of L bits by multiplying a second term of a required decimal number terms by $2^L$, the following formula is established.

$$Q' = {}_{i=1}\Sigma^{K+L-1}\, 2^{L-i}\, {}_{p=0}\Sigma^{K-1}\, n_p\, b_{p+i}$$

where the integer term of the significant L bits of the data Q' is defined as quantized data. When j=L−i, the integer term of Q' is obtained as a value ranging from 0 to L−1.

Hence, the following data 'q' is obtained by quantizing a product between the frequency data B and the count output N by L bits.

$$q = {}_{j=0}\Sigma^{L-1}\, (2^j\, v_j) \quad (2)$$

where $v_j = {}_{p=0}\Sigma K-1\, (n_p\, b_{p+L-j})$ is expressed.

In the above formula (2), each value of $v_j$ can be obtained by performing product and sum computation of $p=0\,\Sigma K^{-1}\, (n_p\, b_{p+L-j})$ for each value of $v_j$.

With respect to each of these values of $v_j$, the frequency data B of (K+L−1) bits from the frequency setting means 23 is divided into K-bit data of L sets in which the start bit is shifted by one bit. Then, these values each indicate a total number of bits in which the computation result of a logical product in units of bits between K-bit data of each set and the count output N of K bits of the counter 24 is 1.

Figure 2:
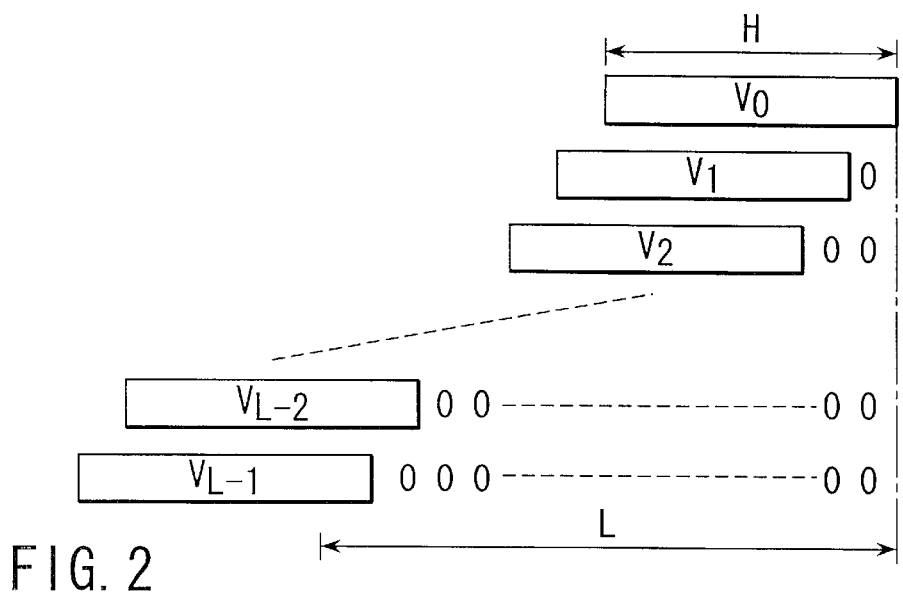
FIG. 2 is a view illustrating the principle of operation of essential portions shown in FIG. 1.

In addition, the quantized data 'q' is added by multiplying $2^j$ for each value of $v_j$ obtained by these product and sum computation. That is, as shown in FIG. 2, each total number data $v_j$ is added by shifting it to the high order side by j bits, respectively, and L-bit data on the low order side of the addition result is extracted, whereby the quantized data can be obtained.

The multiplication/quantization circuit 25 according to this embodiment is configured based on the above principle.

This multiplication/quantization circuit 25 is composed of L product and sum computation circuits 25 (1) to 26 (L) and a shifting/adding circuit 30, as shown in FIG. 1.

Figure 3:
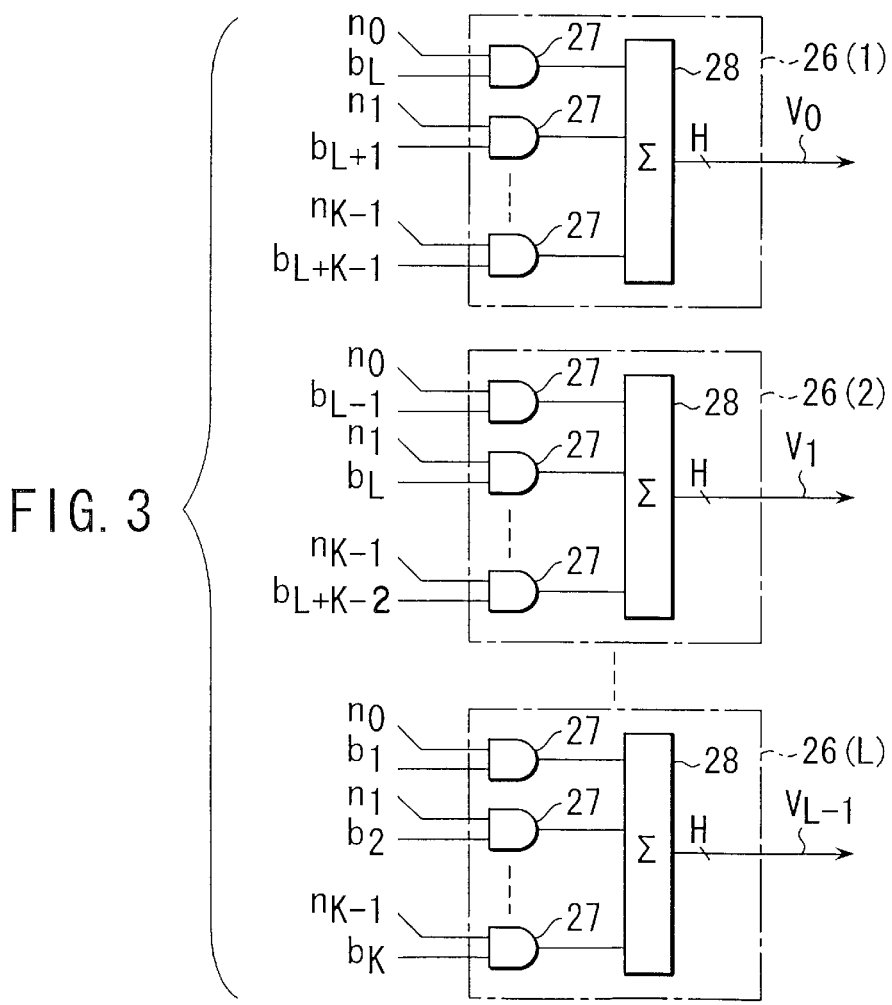
FIG. 3 is a view showing a specific example of a circuit configuration of the essential portions shown in FIG. 1.

The product and sum computation circuits 26 (1) to 26 (L) each are composed of K AND circuits 27 and adders 28, as shown in FIG. 3.

These product and sum computation circuits 26 (1) to 26 (L) process frequency data B of (K+L−1) bits from the frequency setting means 23 by dividing the data into K-bit data ($b_1$ to $b_K$), ($b_2$ to $b_{k+1}$), ... ($b_{L-1}$ to $b_{L+K-2}$), and ($b_L$ to $b_{L+K-1}$) of L sets in which the start data is shifted by one bit each other.

That is, the product and sum computation circuits 26 (1) to 26 (L) computes a logical product in units of bits between these K-bit data and the count output N of K bits of the counter 24 by means of an AND circuit 27. Then, the total number $v_j$ of bits in which the computation result is 1 is obtained for each set by means of an adder 28.

The bit number H of the total number data $v_j$ obtained by each of the product and sum computation circuits 26 (1) to 26 (L) is a value obtained when $2^H$ becomes K or more, and is remarkably smaller than the bit number K+L−1 of the frequency data B. Thus, digits-up processing in this addition is not time consumable.

For example, when K=62 and L=16, the bit number H of total number data $v_j$ is 6, which is much smaller than the bit number K+L−1=77 of the frequency data B.

Referring to FIG. 1, each of the total number data $v_j$ obtained by the product and sum computation circuits 26 (1) to 26 (L) is added by a shifting/adding circuit 30 to be shifted by one bit.

Figure 4:
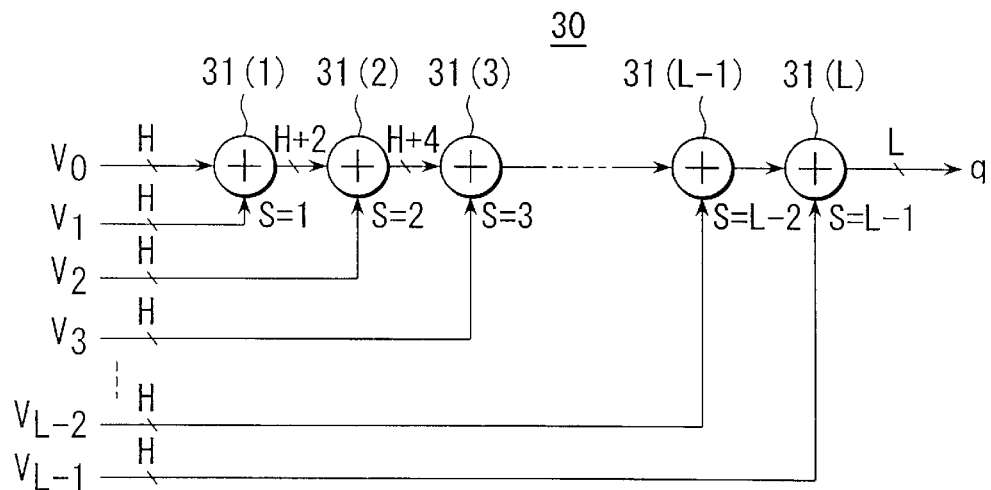
FIG. 4 is a view showing a specific example of a circuit configuration of the essential portions shown in FIG. 1.

This shifting/adding circuit 30, for example, can be configured by using L shift adders 31 (1) to 31 (L), as shown in FIG. 4.

In the data shift processing in the shift adders 31 (1) to 31 (L), after data is merely inputted by shifting digits, 0 is added to the least significant side by the thus shifted digits. Thus, this processing is not time consumable.

Figure 5:
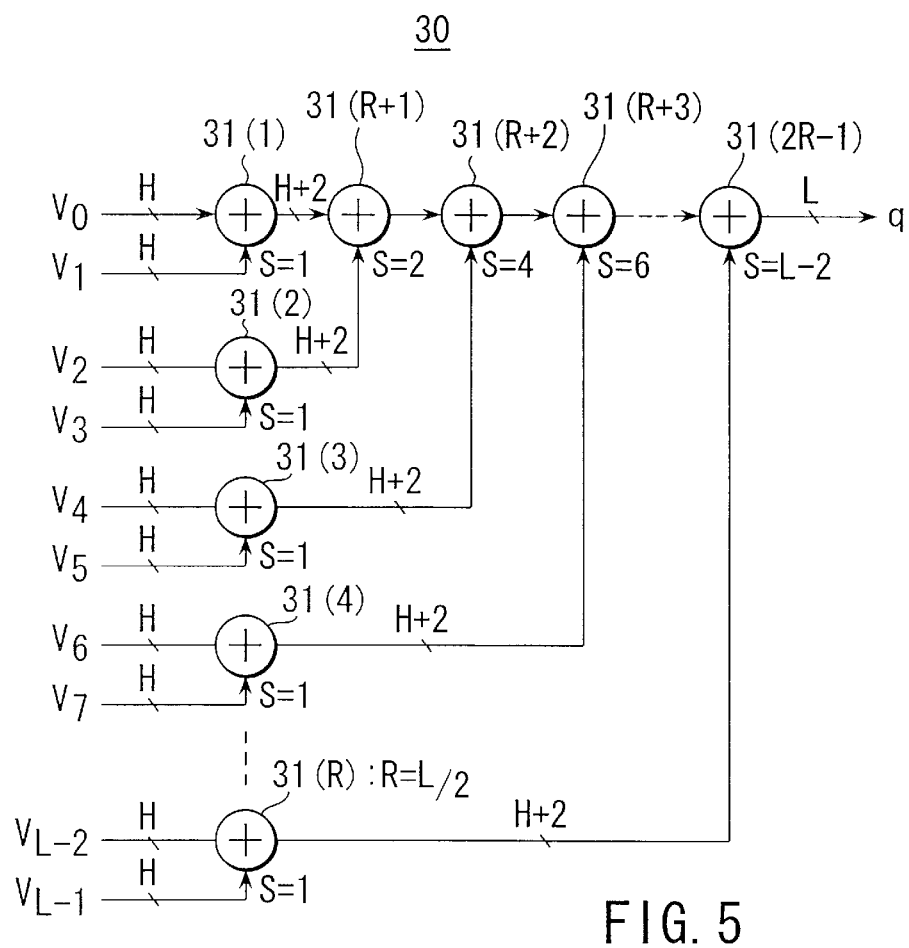
FIG. 5 is a view showing a specific example of a circuit configuration of the essential portions shown in FIG. 1.
Figure 6:
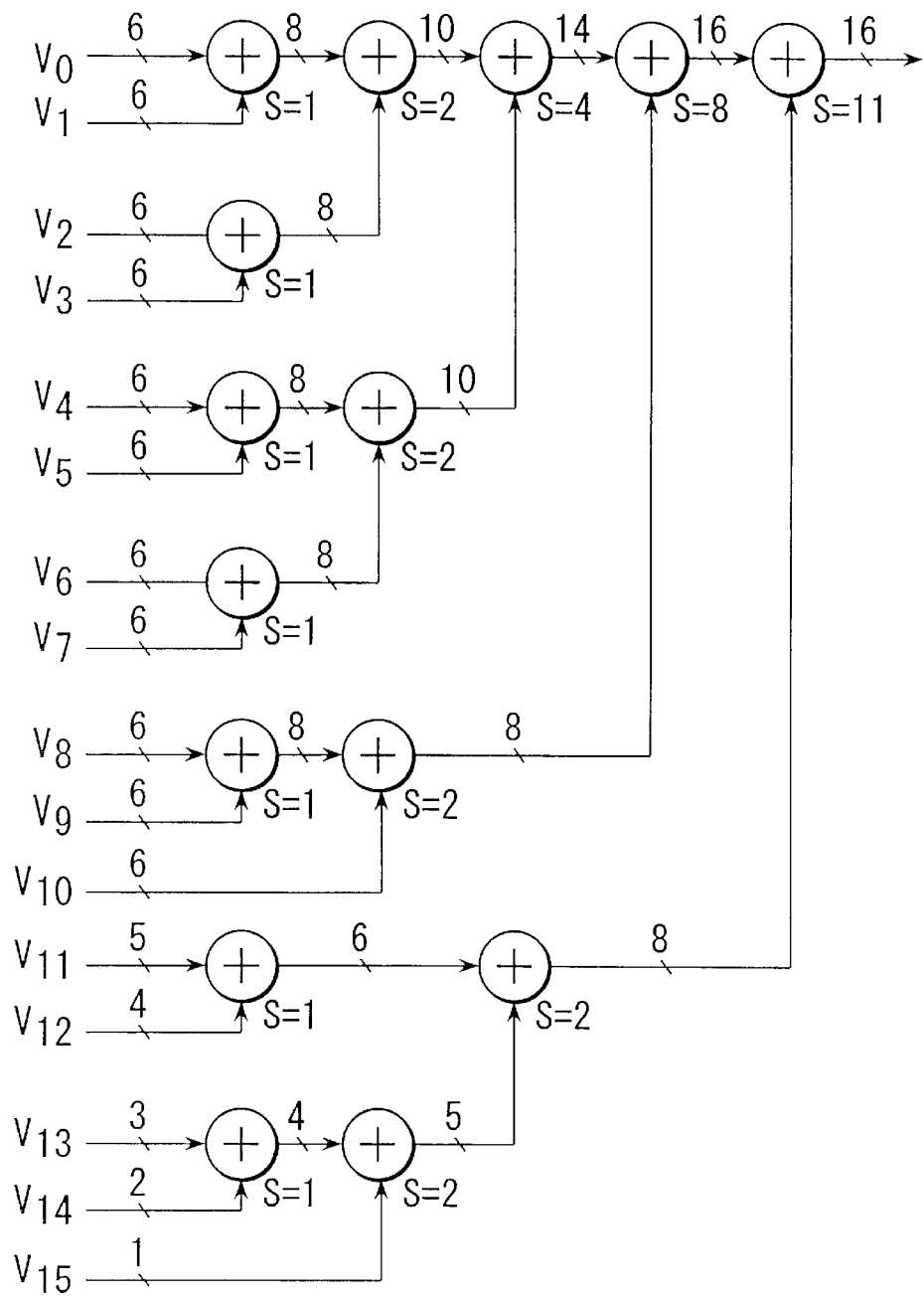
FIG. 6 is a view showing a specific example of a circuit configuration of the essential portions shown in FIG. 1.

In FIG. 4, FIG. 5 and FIG. 6 described later, the number of bits in which a value of S (=1, 2, . . . ) is actually shifted is indicated.

First, the shift adder 31 (1) adds total number data $v_0$ and data obtained by shifting total number data $v_1$ to the high order side by one bit (data obtained when 0 is added to the low order by one bit).

In addition, the shift adder 31 (2) adds an output of the shift adder 31 (1) and data obtained when total number data $v_2$ is shifted to the high order side by 2 bits.

Similarly, shift addition of total number data $v_j$ is performed, and quantized data 'q' quantized in L bits is outputted from the shift adder 31 (L) at the last stage.

In the case where the shifting/adding circuit 30 is configured, as shown in FIG. 4, when L shift adders 31 (1) to 31 (L) are cascade-connected simply, the number of adding steps is L. When L is great, it is disadvantageous in view of speeds. Thus, as in the shifting/adding circuit 30 described later, it is desirable that shifting/adding process be performed in parallel.

That is, formula (2) of the quantized data 'q' can be expanded as follows.
(When L is even number)

$$q(v_0+2v_1)+2^2(v_2+2v_3)+2^4(v_4+2v_5)+\ldots+2^{L-4}(v_{L-4}+2v_{L-3})+2^{L-2}(v_{L-2}+2v_{L-1}) \quad (3)$$

(When L is odd number)

$$q=(v_0+2v_1)+2^2(v_2+2v_3)+2^4(v_4+2v_5)+\ldots+2^{L-3}(v_{L-3}+2v_{L-2})+2^{L-1}v_{L-1} \quad (4)$$

Although the above formulas (3) and (4) can be further put in order by $2^X$, the shift adders 31 that correspond to formula (3) are shown in FIG. 5 as an example.

In this shifting/adding circuit 30, after total number data 'v' has been shift-added by L/2 shift adders 31 (1) to 31 (R) (R=L/2), these outputs are shift-added by means of R−1 shift adders 31 (R+1) to 31 (2R−1), whereby quantized data 'q' of L bits is obtained.

In this way, by including parallel processing, the number of adding steps can be reduced to half of that of the shifting/adding circuit 30, enabling fast processing.

As described previously, formula (3) or formula (4) is further put in order by $2^X$, the number of adding steps can be further reduced. This will be described in the Description of Operation section.

Now, an operation of this embodiment will be described when K=62 and L=16, for example.

In FIG. 1, when 77-bit frequency data B (b1 to b77) is set by the frequency setting means 23, each of the product and sum computation circuits 26 (1) to 26 (16) performs the following calculation for 62-bit count output N (n0 to n61) of the counter 24.

$$v_0 = \sum_{p=0}^{61} (n_p \, n_{p+16})$$

$$v_1 = \sum_{p=0}^{61} (n_p \, n_{p+15})$$

$$v_2 = \sum_{p=0}^{61} (n_p \, n_{p+14})$$

$$\cdots\cdots$$

$$v_{15} = \sum_{p=0}^{61} (n_p \, n_{p+1})$$

In this manner, each of total number data $v_0$ to $v_{15}$ is obtained, and outputted to the shifting/adding circuit 30.

In this case, as described previously, the bit number H of each of the total number data $v_0$ to $v_{15}$ is 6 bits.

The shifting/adding circuit 30 performs shifting/adding process for the total number data $v_0$ to $v_{15}$ in accordance with the formula below.

$$q = [v_0 + 2v_1 + 2^2 v_2 + \ldots + 2^{14} v_{14} + 2^{15} v_{15}]_{mod16}$$
$$= [v_0 + 2v_1 + 2^2 v_2 + \ldots + 2^{10} v_{10}]_{mod16} +$$
$$[2^{11} v_{11}]mod16 + [2^{12} v_{12}]mod16 +$$
$$[2^{13} v_{13}]mod16 + [2^{14} v_{14}]mod16 +$$
$$[2^{15} v_{15}]mod16$$

where a brace sign $[Y]_{mod16}$ indicates data obtained with modulo $2^{16}$ of Y.

Here, the data generated by shifting 6-bit data $v_j$ by 11 bits (0 is assigned to the low order side by 11 bits), thereby extracting the least significant 16 bits is equal to the data obtained when data $V_j$ of the least significant 5 bits of the original 6-bit data $v_j$ is shifted by 11 bits.

Therefore, when the least significant 5 bits of $v_{11}$ is defined as $V_{11}$, the least significant 4 bits of $v_{12}$ is defined as $V_{12}$, the least significant bits of $v_{13}$ is defined as $V_{13}$, the least significant 2 bits of $v_{14}$ is defined as $V_{14}$, and the least significant 1 bit of $v_{15}$ (LSB) is defined as $V_{15}$, the quantized data 'q' is obtained below.

$$q = [v_0 + 2v_1 + 2^2 v_2 + \ldots 2^{10} v_{10}]mod16 +$$
$$[2^{11} v_{11}]mod16 + [2^{12} v_{12}]mod16 +$$
$$[2^{13} v_{13}]mod16 + [2^{14} v_{14}]mod16 +$$
$$[2^{15} v_{15}]mod16 =$$
$$[\{(v_0 + 2v_1) + 2^2(v_2 + 2v_3)\} +$$
$$2^4\{(v_4 + 2v_5) + 2^2(v_6 + 2v_7)\} +$$
$$2^8\{(v_8 + 2v_9) + 2^2 v_{10}\}]mod16 +$$
$$[2^{11}\{(v_{11} + 2v_{12}) +$$
$$2^2(v_{13} + 2v_{14}) + 2^4 v_{15}\}]mod16$$

The shifting/adding circuit 30 performs the above computation by means of 15 shift adders 31 (1) to 31 (15), as shown in FIG. 6.

This shifting/adding circuit 30 has a maximum of 5 adding stages, and each shift adder 31 merely performs adding process in a maximum of 16 bits.

In addition, the counter 24 that counts a clock signal CK is much faster than a conventional M-bit adder. Thus, even in the case where a clock frequency is as high as 100 MHz, for example, a frequency can be set at a resolution of 77 bits.

Therefore, the frequency synthesizer 20 according to this embodiment realizes a high frequency resolution in a wide bandwidth.

Thus, the frequency synthesizer 20 according to this embodiment has a high frequency resolution in a wide bandwidth. Thus, this synthesizer can be used as a signal source of a general signal generator.

In addition, the frequency synthesizer 20 according to this embodiment can be used without any problem even in the case where a frequency resolution of 16 digits or more is required such as a case in which an arbitrary frequency signal is generated when an output (for example, 100 MHz) of a hydrogen maser oscillator of $10^{15}$ in frequency precision is defined as a reference clock signal CK.

Further, this frequency synthesizer 20 is very high in frequency setting resolution. Thus, thus synthesizer can be used as a sine wave generation portion in the case where a Gaussian noise close to the Gaussian distribution is generated with high precision.

Now, a Gaussian noise generator for generating a Gaussian noise signal using this frequency synthesizer will be described here.

The Gaussian noise generator described below is based on the finding that, when the frequencies of a plurality of sine waves are selected without any duplication from among a geometric series in which a u-order algebraic integer relevant to an integer 'u' greater than the number of the sine waves is defined as a common rate, a distribution of sample values of a composite wave formed by synthesizing the plurality of sine waves is close to a Gaussian distribution (a detailed description of a method of proving this finding can be referred to an article as follows: Mark Kac, "Statistical Independence in Probability Analysis and Number Theory". The Mathematical Association of America 1959, pp. 36–52).

Here, the u-order algebraic integer is a positive root of the following polynomial U(x):

$$U(x)=x^u+m_{u-1} x^{u-1} + \ldots + m_1 x + m_0$$

(where coefficients $m_0$ to $m_{u-1}$ are integers.)
In this polynomial, U(x) is irreducible in the range of integer coefficients, that is, U(x) cannot be factorized.

For example, assuming that E is a prime number and a value $E^{1/u}$ is a root of the above polynomial U(x), i.e., a u-order algebraic integer, a Gaussian noise signal can be obtained by selecting the frequencies of the sine waves from among the following geometric series in which the value $E^{1/u}$ is defined as a common rate:

$$E^{1/u}/G, E^{2/u}/G, E^{3/u}/G, \ldots, E^{(u-1)/u}/G$$

(where G denotes an integer of 1 or more).

Figure 7:
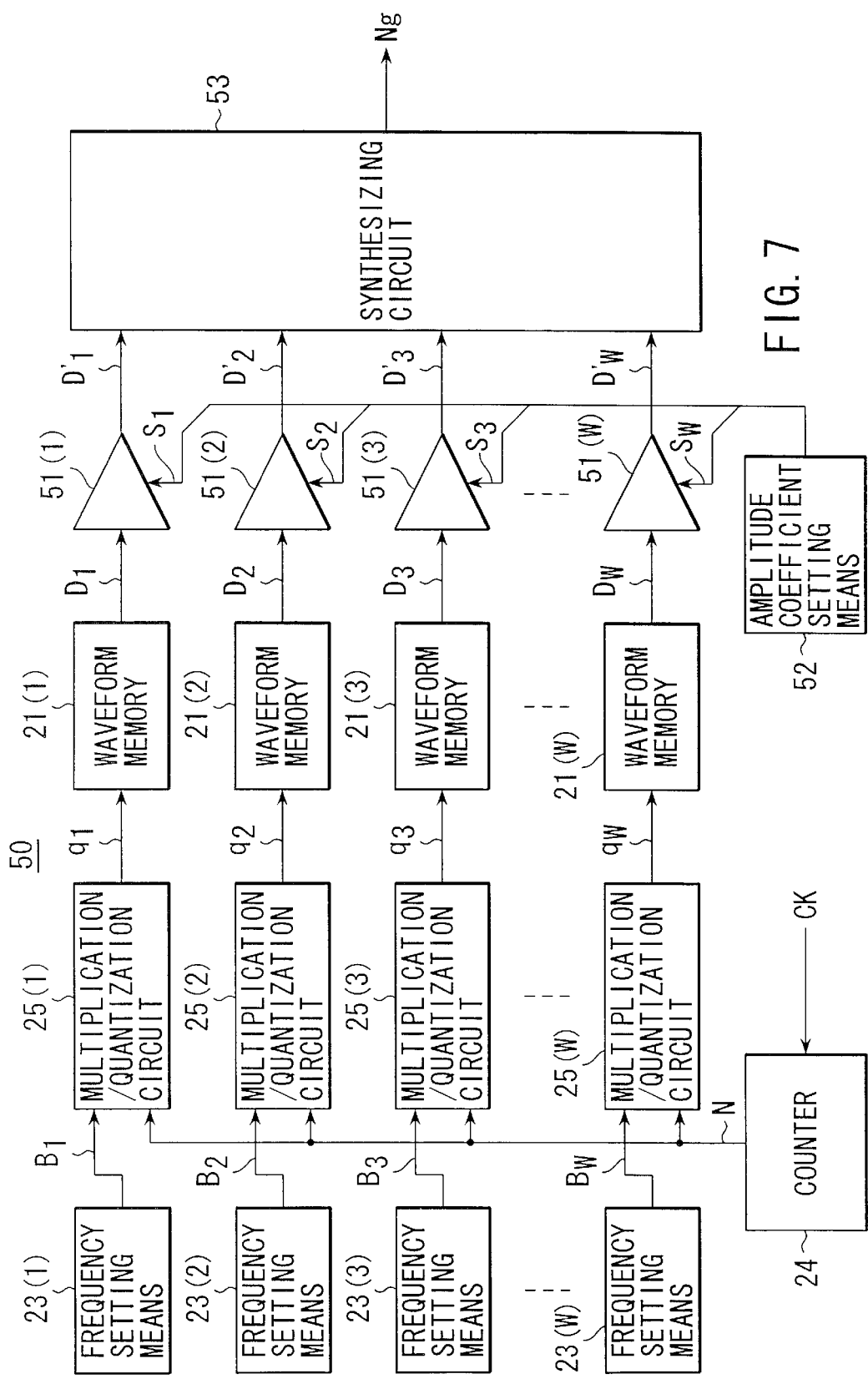
FIG. 7 is a block diagram depicting a configuration of a Gaussian generator according to one embodiment of the present invention.

FIG. 7 is a block diagram depicting a configuration of such noise signal generator 50.

This noise signal generator 50 comprises: a waveform memory 21 of foregoing frequency synthesizer 20; and a sine wave generation portion for generating a plurality of sine waves with their different frequencies in parallel by using a plurality of frequency setting means 23 and multiplication/quantization circuit 25.

In addition, the noise signal generator 50 comprises a Gaussian noise generation portion for adding and synthesizing a plurality of sine waves from the above mentioned sine wave generation portion, thereby generating a Gaussian noise signal.

At the sine wave generation portion of this noise signal generator 50, W waveform memories 21 (1) to 21 (W) (W denotes an integer of 1 or more and less than 'u') are provided as amplitude data output means.

These waveform memories 21 (1) to 1 (W) each stores the same sine wave data in regions that can be specified by a L-bit address signal for one cycle.

The sine wave data is expressed as $\cos(2\pi q/2^L)$ or $\sin(2\pi q/2^L)$ when L-bit quantized data for specifying an address is defined as 'q'.

The frequency setting means 23 (1) to 23 (W) set frequency data $B_1$ to $B_W$ that correspond to the frequencies selected without any duplication from among a geometrical series in which the u-order algebraic integer is defined as a common rate to multiplication/quantization circuits 25 (1) to 25 (W), respectively.

For example, in the case of generating a noise signal in which a spectrum is distributed in the bandwidths of an upper limit frequency 'fa' and a lower limit frequency 'fb', frequency data $B_1$ to $B_W$ are set as follows in the range of frequencies fa/fc and fa/fc normalized at a clock frequency 'fc'.

$B_1 = E^{1/u}/G$ $B_2 = E^{2/u}/G$ $B_3 = E^{3/u}/G$

. . . . . .

$B_W = E^{W/u}/G$

In addition, multiplication/quantization circuits 25 (1) to 25 (W) multiply frequency data $B_1$ to $B_W$ and the count output N of the counter 24 set by the frequency setting means 23 (1) to 23 (W), respectively, in a manner similar to the above, and quantifies them to L bits. Then, the quantized data $q_1$ to $q_W$ are outputted as address signals to their respective waveform memories 21 (1) to 21 (W).

Then, multipliers 51 (1) to 51 (W) multiply amplitude coefficients $S_1$ to $S_W$, respectively, set by amplitude coefficient setting means 52 relevant to amplitude data $D_1$ to $D_W$ outputted from waveform memories 21 (1) to 21 (W). The multiplication result is outputted to a synthesizing circuit 53 as a Gaussian noise generation portion of the Gaussian noise generator 50.

This synthesizing circuit 53 adds and synthesizes outputs of the multipliers 51 (1) to 51 (W), and the addition result is output as a noise signal Ng.

In the case of requiring an analog noise signal, a digital output of the synthesizing circuit 53 is converted into an analog signal by means of a D/A converter (not shown), and the converted signal is outputted.

In the thus configured Gaussian noise generator 50, as described previously, shifting and quantization between frequency data $B_1$ to $B_W$ of K+L−1 bits and the count output N of K bits of the counter 24 are performed by means of multiplication/quantization circuits 25 (1) to 25 (W), whereby L-bit quantized data $q_1$ to $q_W$ are outputted to waveform memories 21 (1) to 21 (W).

Thus, from the waveform memories 21 (1) to 21 (W), the following amplitude data $D_1$ to $D_W$ are outputted in parallel by one clock.

$$D_1 = \cos(2\pi q_1/2^L)$$

$$D_2 = \cos(2\pi q_2/2^L)$$

$$D_3 = \cos(2\pi q_3/2^L)$$

. . . . . .

$$D_W = \cos(2\pi q_W/2^L)$$

Then, these amplitude data $D_1$ to $D_W$ are multiplied by amplitude coefficients $S_1$ to $S_W$, and the following multiplication results are outputted to the synthesizing circuit 53:

$$D_1' = S_1 \cos(2\pi q_1/2^L)$$

$$D_2' = S_2 \cos(2\pi q_2/2^L)$$

$$D_3' = S_3 \cos(2\pi q_3/2^L)$$

. . . . . .

$$D_W' = S_W \cos(2\pi q_W/2^L)$$

Then, the data obtained when these multiplication results are added and synthesized by this synthesizing circuit 53 is output as a noise data signal Ng.

Figure 8A:
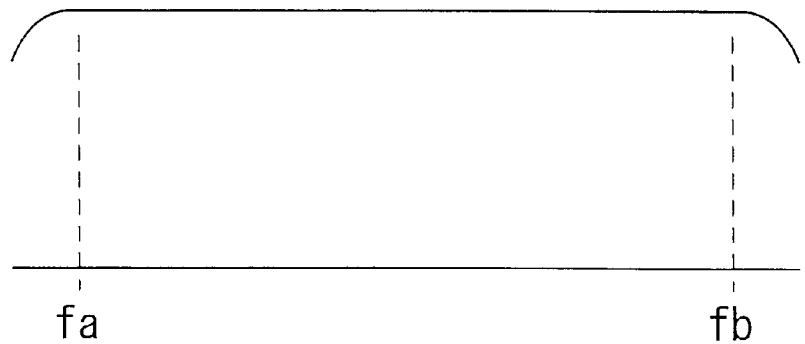
FIG. 8A and FIG. 8B are views each showing an example of a spectrum of an output of the Gaussian noise generator shown in FIG. 7.

Here, all amplitude coefficients $S_1$ to $S_W$, for example, are set to be equal to each other by the amplitude coefficient setting means 52, whereby a white Gaussian noise in which spectrum is distributed substantially uniformly in the set frequency ranges of 'fa' to 'fb' can be obtained, as shown in FIG. 8A.

Figure 8B:
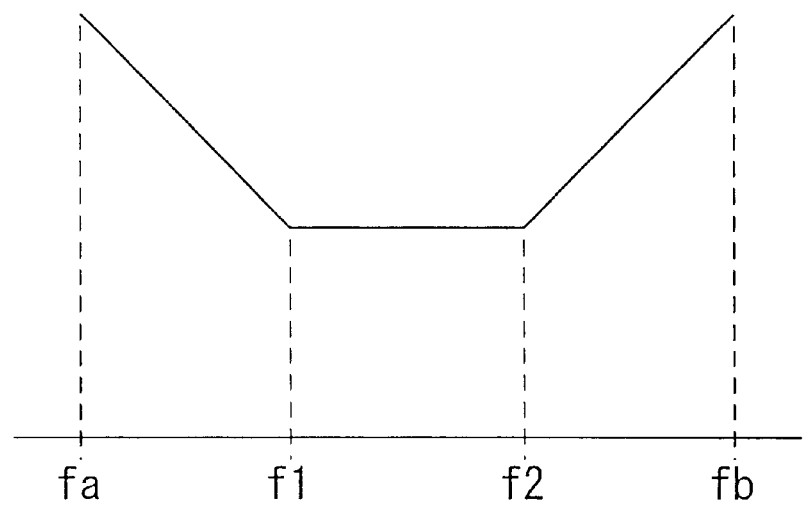

In addition, the amplitude coefficient setting means 52 provides settings so that an amplitude coefficient decreases in inverse proportion to the frequencies in the range of frequencies 'fa' to 'f1', and; an amplitude coefficient is constant in the range of the frequencies of 'f1' to 'f2'; and an amplitude coefficient increases in proportion to the frequency in the range of frequencies of 'f2' to 'fb', whereby a colored Gaussian noise in which a spectrum distribution is not uniform can be obtained, as shown in FIG. 8B.

In the Gaussian noise generator 50, a plurality of the above frequency synthesizer is used to generate and synthesize a plurality of sine waves from each frequency synthesizer in parallel, thus operation speed is high, and Gaussian noise can be generated to the high frequency band.

In the aforementioned Gaussian noise generator 50, the related circuit becomes large-scaled according to the number of sine waves. Thus, this generator is advantageous in the case where a Gaussian noise signal in a high frequency bandwidth is generated in a comparatively narrow bandwidth, for example.

Figure 9:
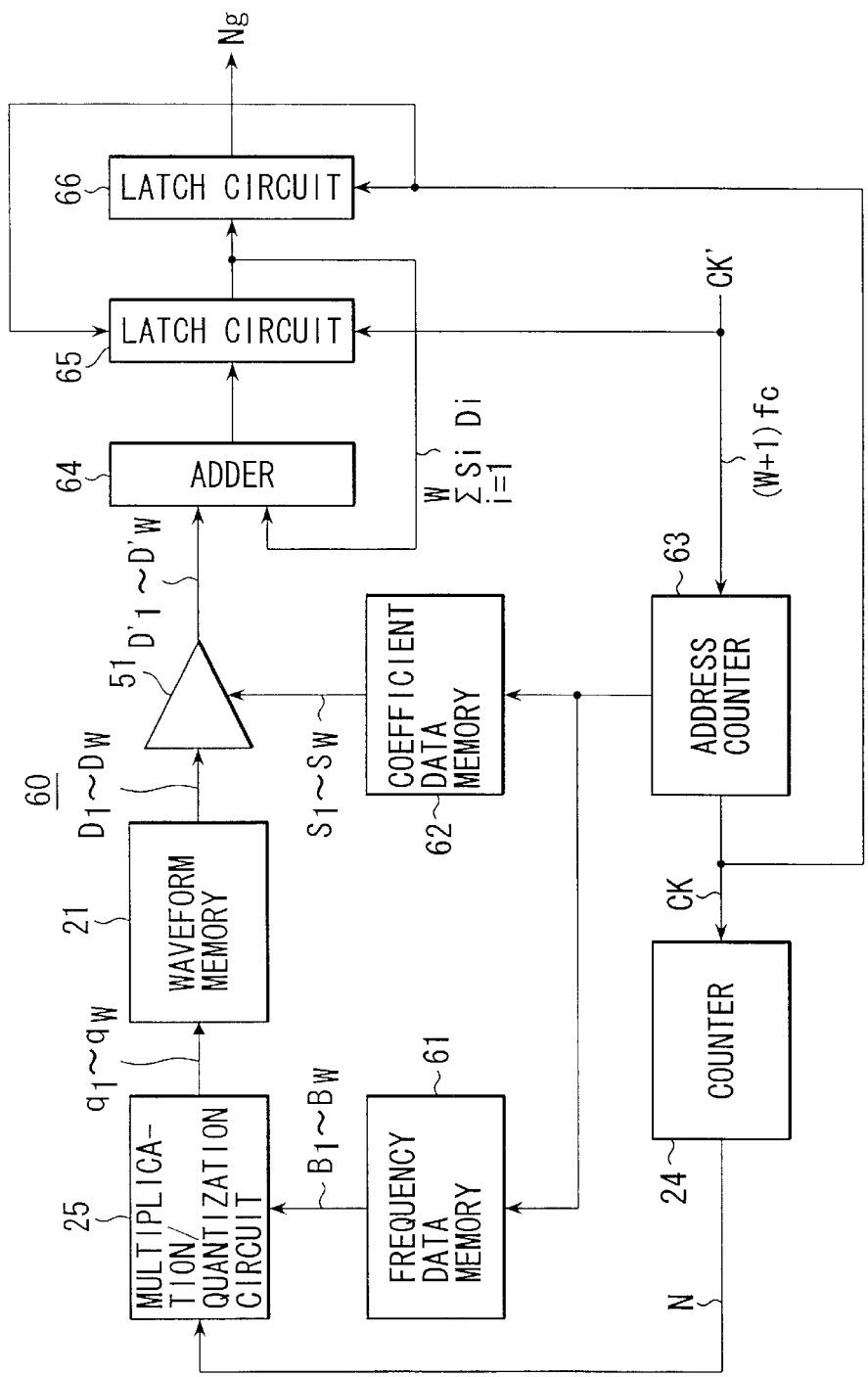
FIG. 9 is a block diagram showing a configuration of a Gaussian noise generator according to another embodiment of the present invention.

In addition, in the case where a large number of sine waves are generated, as in the Gaussian noise generator 60 as shown in FIG. 9, frequency data and coefficients are switched at a high speed by using a single frequency synthesizer, whereby a Gaussian noise with a wide bandwidth can be generated in a simple circuit configuration.

That is, this Gaussian noise generator 60 comprises: a frequency data memory 61 that stores frequency data $B_1$ to $B_W$ (K+L−1 bits) of the plurality of sine waves in advance in order of addresses; a coefficient data memory 62 that stores coefficients $S_1$ to $S_W$ in advance in order of addresses; and an address counter 63 that consists of counters in (W+1) notation for reading out data in order from these memories.

This address counter 63 counts frequency clock signals CK' of (W+1) times the clock signal frequency fc.

This address counter 63 reads out frequency data $B_1$ to $B_W$ and coefficients $S_1$ to $S_W$ in synchronism with a clock signal CK' one by one, by specifying addresses of the frequency data memory 61 and the coefficient data memory 62 through a count output until a clock signal CK' has been inputted to 1 to W clocks.

In addition, this address counter 63 outputs a clock signal CK by one clock to the counter 24 when (w+1) the clock signal is inputted.

This clock signal CK is also used as a reset signal for a latch circuit 65 described later.

In addition, the counter 24 counts a clock signal CK from an address counter 63, and inputs the count output N of k bits to a multiplication/quantization circuit 25 in a manner similar to the above.

This multiplication/quantization circuit 25 performs shifting and quantization between the count output N of the counter 24 and frequency data $B_1$ to $B_W$ of K+L−1 bits sequentially outputted from a frequency data memory 61, whereby L-bit quantized data $q_1$ to $q_W$ relevant to the same count output N are sequentially outputted as address signals to a waveform memory 21.

This waveform memory 21 sequentially outputs amplitude data $D_1$ to $D_W$ of the addresses specified by quantized data $q_1$ to $q_W$.

This multiplier 51 multiply amplitude data $D_1$ to $D_W$ sequentially read out from the waveform memory 21 in synchronism with the clock signal CK' by coefficients $S_1$ to $S_W$ sequentially read out from the coefficient data memory in synchronism with the clock signal CK', whereby the multiplication results $S_1 \cdot D_1$ to $S_W \cdot D_W$ are sequentially outputted to an adder 64.

This adder 64 adds an output of the multiplier 51 and an output of a latch circuit 65 to each other, thereby inputting the addition result to the latch circuit 65.

This latch circuit 65 latches an output of the adder 64 every time the circuit receives a clock signal CK', and inputs the latch output to the adder 64.

Thus, when the count result of the address counter 63 reaches W, the latch circuit 65 stores a sum of the multiplication results of $S_1 \cdot D_1$ to $S_W \cdot D_W$ of each frequency obtained with respect to one of the count results N of the counter 24.

This latch circuit 65 receives a clock signal CK as a reset signal, and resets the storage contents to 0.

In addition, a latch circuit 66 latches the data latched in the latch circuit 65 upon the receipt of a clock signal 'CK', thereby outputting the data as noise signal data Ng.

In the thus configured Gaussian noise generator 60, the amplitude data of one frequency is generated every time the count value of the address counter 63 advances by one.

In this Gaussian noise generator 60, when the count value of the address counter 63 advances by W, W types of the amplitude data with their different frequencies are obtained stepwise one by one. Then, noise signal data obtained when these data are added is outputted, and an operation that the count output N of the counter 24 advances stepwise one by one is repeated, thereby generating a Gaussian noise signal in a manner similar to that in the Gaussian noise generator 50.

In this Gaussian noise generator 60, frequency data $B_1$ to $B_W$ and coefficients $S_1$ to $S_W$ are switched sequentially while the counter 24 advances stepwise by 1, thereby generating noise signal data for each frequency. Thus, there is provided an advantage that, even in the case where a large number of frequencies of sine waves are generated, the generator can be simply constructed.

In general, the address counter 63 and the latch circuits 65 and 66 are provided as very fast devices. The number of bits in the adder 64 depends on the amplitude resolution of noise signal data, and is generally 20 bits or less. Thus, these delays are not problematic.

In addition, the aforementioned Gaussian generators 50 and 60 are combined with each other, thereby making it possible to configure a Gaussian noise generator having its circuit scale smaller than the Gaussian noise generator 50 and enabling faster operation than the Gaussian noise generator 60.

Figure 10:
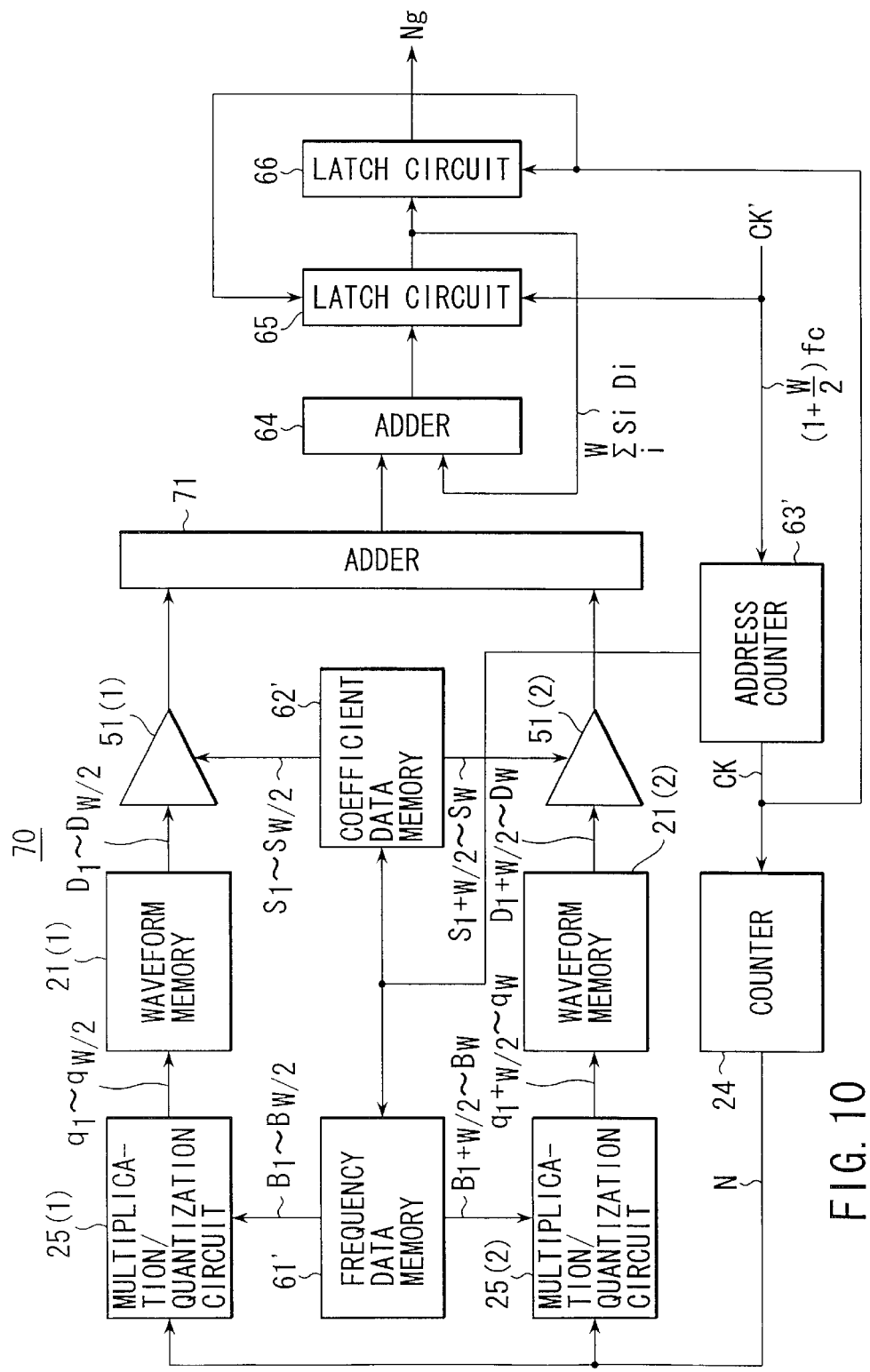
FIG. 10 is a block diagram depicting a configuration of a Gaussian noise generator according to still another embodiment of the present invention.

For example, when W is an even number, as in a Gaussian noise generator 70 shown in FIG. 10, there are provided two sets of waveform memory 21, multiplication/quantization circuit 25, and multiplier 51, for example (three or four sets may be provided).

Then, in a frequency data memory 61', two frequency data are stored so that these data can be outputted by specifying one address.

In addition, in a frequency data memory 62' as well, two coefficients that correspond to two frequency data outputted from the frequency data memory 61 by specifying one address are stored so that these coefficients can be outputted.

The frequency data memory 61' outputs frequency data $B_1$ to $B_{W/2}$ sequentially to one multiplication/quantization circuit 25 (1), for example, and outputs frequency data $B_{1+W/2}$ to $B_W$ sequentially to another multiplication/quantization circuit 25 (2).

Similarly, the coefficient data memory 62' outputs frequency data $S_1$ to $S_{W/2}$ sequentially to one multiplier 51 (1), for example, and outputs frequency data $S_{1+W/2}$ to $S_W$ sequentially to another multiplier 51 (2).

The frequency of the clock signal CK' is defined as $\{1+(W/2)\}$ fc.

In addition, an address counter 63' specifies the addresses of a frequency data memory 61' and a coefficient data memory 62' and by its count output until this clock signal CK' has been inputted by 1 to W/2 clocks, and outputs a clock signal CK to the counter 24 at a 1+(W/2) clock.

Further, the outputs of the multipliers 51 (1) and 51 (2) are temporarily added by means of an adder 71, and then, these addition results are outputted to the adder 64.

In the thus configured Gaussian noise generator 70, the amplitude data with their two different frequencies are generated every time the count value of the address counter 63' advances stepwise by one.

Then, in this Gaussian noise generator 70, the count value advances stepwise by up to W/2, and W types of amplitude data with their different frequencies are obtained one by one. Then, the noise signal data obtained when these frequencies are added are outputted. In addition, an operation that the count output of the counter 24 advances stepwise by one is repeated, whereby the Gaussian noise signal is generated in a manner similar to the above.

Therefore, there is provided an advantage that this Gaussian noise generator 70 enables operation at a speed that is substantially twice as high as that of the Gaussian noise generator 60, and is configured simpler than the Gaussian noise generator 50.

In the present embodiment, the waveform memory 21 that stores amplitude data in advance is used as amplitude data output means for outputting amplitude data having a periodic function that includes a sine wave of a phase specified by L-bit data.

Hence, this generator does not limit the present invention. The generator may be provided so that predetermined approximation computation is performed for L-bit data, whereby the amplitude data of a periodic function is outputted.

For example, in the case of outputting a sine wave signal with its high frequency bandwidth that does not require high waveform precision, amplitude data may be outputted by performing computation of a function obtained by approximating a sine wave by a trapezoidal wave or triangular wave.

That is, in the case of approximation using a triangular wave, when the inputted L-bit data 'q' is in the range of 0 to $(2^L/4)-1$, the inputted data 'q' may be outputted intact as amplitude data.

In addition, when L-bit data 'q' is in the range of $(2^L/4)$ to $(2^L/2)-1$, a value obtained by subtracting data 'q' from $(2^L/2)-1$ is outputted as amplitude data.

When L-bit data 'q' is in the range of $(2^L/2)$ to $(3\cdot 2^L/4)-1$, a value obtained by subtracting the data 'q' inputted from $(2^L/2)$ is outputted as amplitude data.

When L-bit data 'q' is in the range of $(3\cdot 2^L/4)$ to $(2^L-1)$, a value obtained by subtracting $2^L$ from the inputted data 'q' is outputted as amplitude data.

In the case of approximation using a trapezoidal wave, fixed amplitude data of the amplitude data of the above triangular wave is outputted in a predetermined range of $(2^L/4)-1$ or its proximity and a predetermined range of $(3\cdot 2L/4)-1$ or its proximity.

In the manner, in amplitude data output means for computing and outputting the amplitude data approximated by the triangular wave or trapezoidal wave and the like, its computation processing is very simple so that a periodic function signal can be outputted at a very high speed.

A bandwidth is limited by using a filter for this approximation signal, whereby an output waveform can be formed as a sine wave.

On the other hand, even if a frequency is low, in the case where high waveform precision is required, computation using the following approximation formula is performed.

That is, the approximation formula having precision of $2\times 10^{-4}$ relevant to a sine wave $\sin(2\pi a)$, for example in the range in which an absolute value of 'a' is ¼ or less is expressed as follows:

$$f(a)=2\pi a\,[1-0.16605\,(2\pi a)^2+0.00761\,(2\pi a)^4]$$

where $a=q/2^L$.

Therefore, when L-bit data 'q' is in the range of 0 to $(2^L/4)-1$, the amplitude data obtained by defining the computation result of $f(q/2^L)\times(2^{L-1}-1)$ as an integer is outputted.

In addition, when L-bit data 'q' is in the range of $(2^L/4)$ to $(3\cdot 2^L/4)-1$, the amplitude data obtained by defining the computation result of $f(½-q/2^L)\times(2^{L-1}-1)$ as an integer is outputted.

Further, when L-bit data 'q' is in the range of $(3\cdot 2^L/4)$ to $(2^L-1)$, the amplitude data obtained by defining the computation result of $f(q/2^L-1)\times(2^{L-1}-1)$ is outputted.

The above mentioned Gaussian noise generator 70 uses the frequency synthesizer 20 as a signal source of a fixed frequency.

Hence, as a use mode of the frequency synthesizer, there is a case in which a frequency of an output signal is frequently changed by frequency sweeping or manual operation.

In this manner, in a frequency synthesizer in which the frequency of an output signal is frequently changed, there is a problem that a noise is generated due to phase discontinuation during frequency change.

Figure 11:
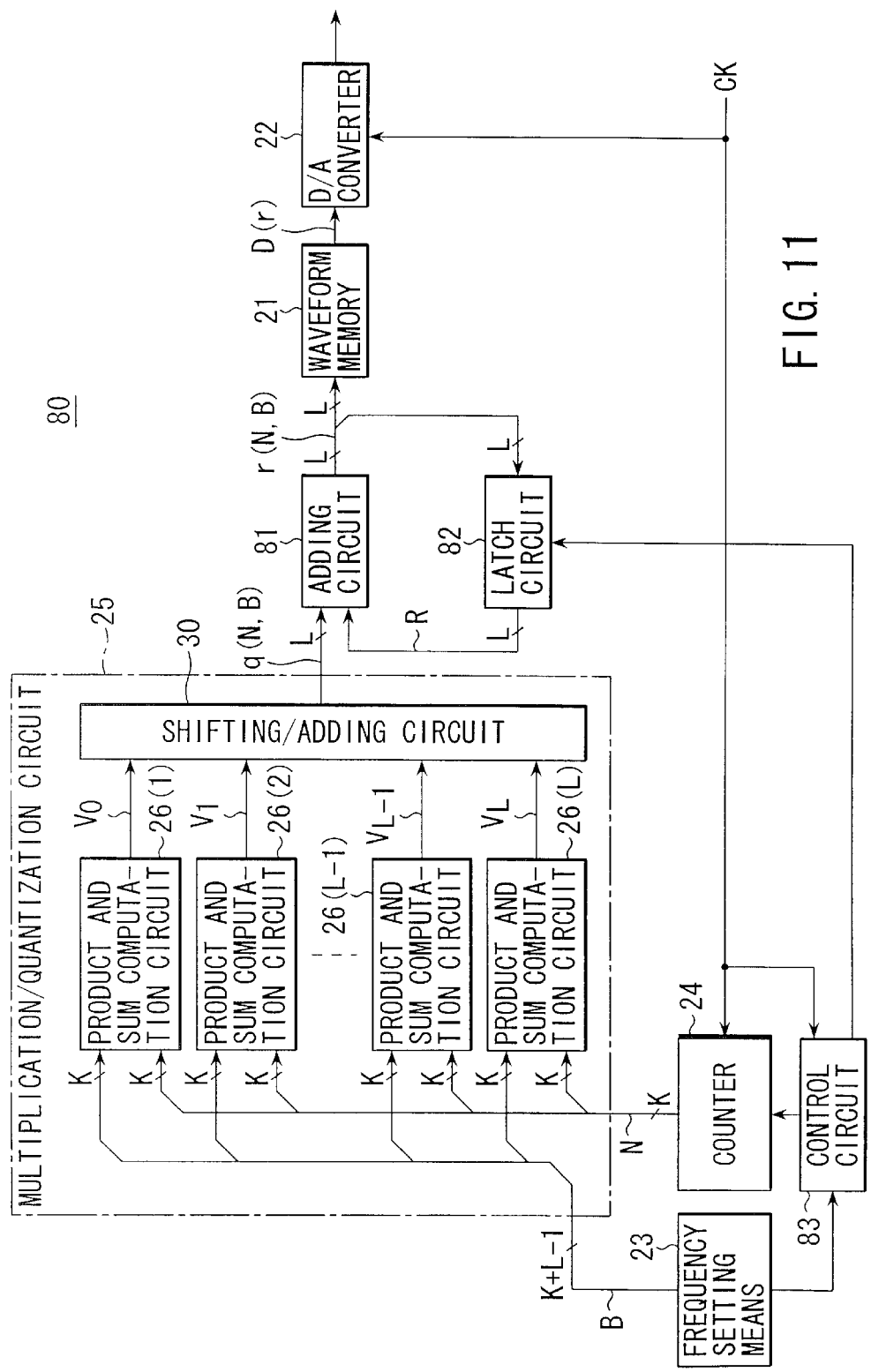
FIG. 11 is a block diagram depicting a configuration of a frequency synthesizer according to another embodiment of the present invention.

FIG. 11 shows a configuration of a frequency synthesizer capable of reducing noise generation due to such phase discontinuation.

This frequency synthesizer 80 comprises: a waveform memory 21 that is amplitude data output means; frequency setting means 23; a counter 24; and a multiplication/quantization circuit 25 in the same way as the frequency synthesizer 20. In addition, an L-bit adding circuit 81 is provided between a shifting/adding circuit 30 of this multiplication/quantization circuit 25 and the waveform memory 21.

In addition, this frequency synthesizer 80 is configured so that a latch circuit 82 latches L-bit data inputted from this adding circuit 81 to the waveform memory 21 upon reception of a latch signal LH (FIG. 12E), thereby inputting a latch output R thereof to an adding circuit 81.

Further, a control circuit 83 outputs a set signal SET to the counter 24 every time frequency data is changed by the frequency setting means 23, and initializes the count output L of the counter 24 to a value 1 (or its proximity).

Furthermore, this control circuit 83 outputs a latch signal LH to the latch circuit 82 in accordance with a timing at which L-bit data corresponding an output of the initialized counter 24 is outputted from a shifting/adding circuit 30. In this manner, a phase value immediately before frequency change of amplitude data outputted from the waveform memory 21 and a phase value immediately after such frequency change are substantially made continuous each other.

Figure 12:
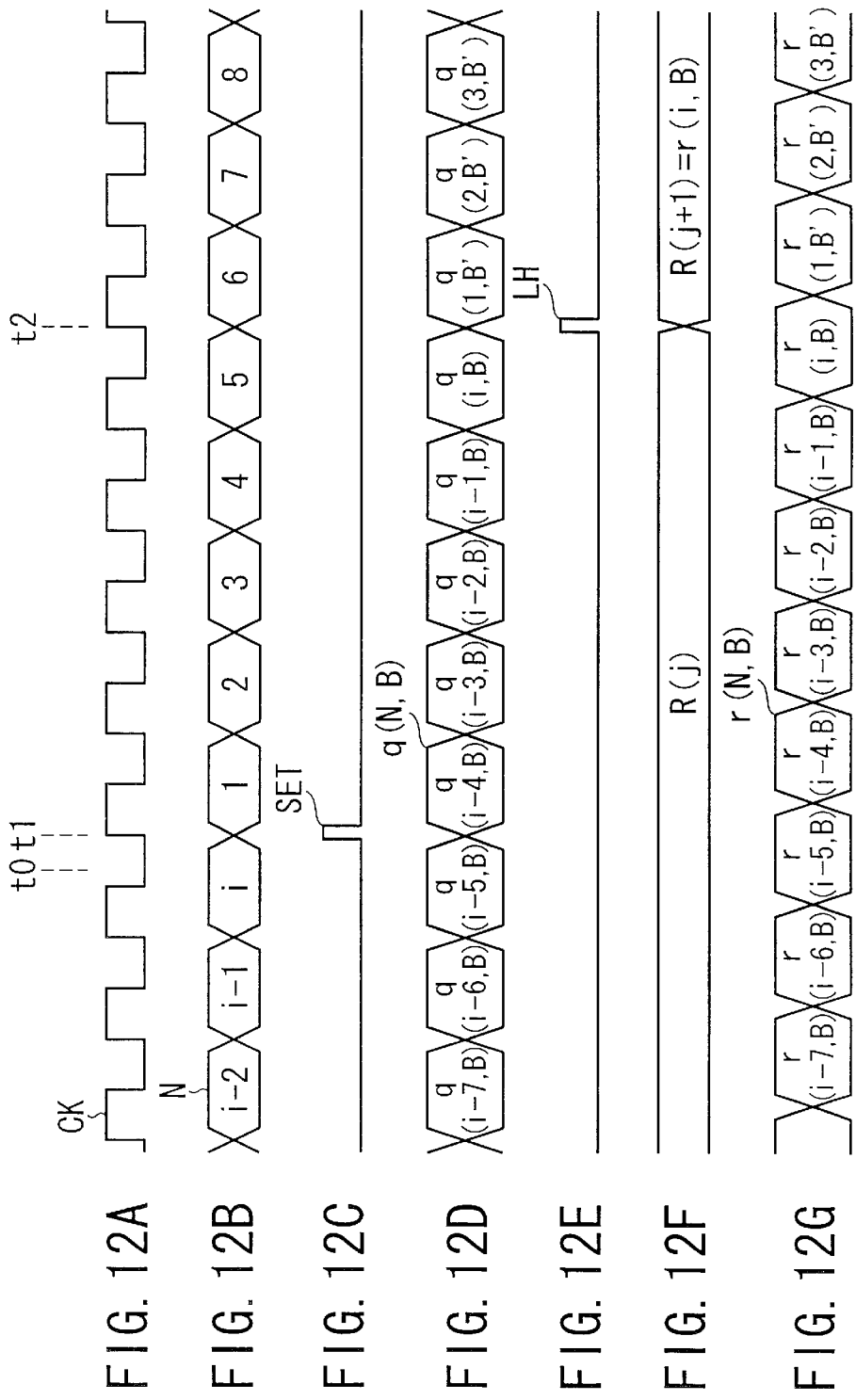
FIG. 12A to FIG. 12G are timing charts each illustrating an operation of the frequency synthesizer shown in FIG. 11.

In the thus configured frequency synthesizer 80, the count output N of the counter 24 increases one by one, as shown in FIG. 12B every time the clock signal CK shown in FIG. 12A is inputted.

Then, in the frequency synthesizer 80, product and sum computation between the count value N and the frequency data B from the frequency setting means 23 is performed by means of product and sum computation circuits 26 (1) to 26 (L) in a manner similar to the above, whereby total number data $v_j$ is obtained.

In addition, in this frequency synthesizer 80, the shifting/adding process relevant to the total number data $v_j$ is performed by means of the shifting/adding circuit 30, whereby the quantized data 'q' (N, B) is outputted to the count output N at a timing that is delayed by the number of clocks (by 5 clocks in this example) according to the number of addition steps in the shifting/adding circuit 30, as shown in FIG. 12D.

The quantized data 'q' (N, B) is inputted to an adding circuit 81 together with the latch output R (j) latched in the latch circuit 82, as shown in FIG. 12F.

Then, the least significant L-bit data 'r' (N, B) of the addition result is outputted to the waveform memory, as shown in FIG. 12G, whereby amplitude data D (r) of an address (phase) specified by the data 'r' (N, B) is outputted from the waveform memory 21.

The above operation is repeated until the frequency data B has been changed.

Figure 13:
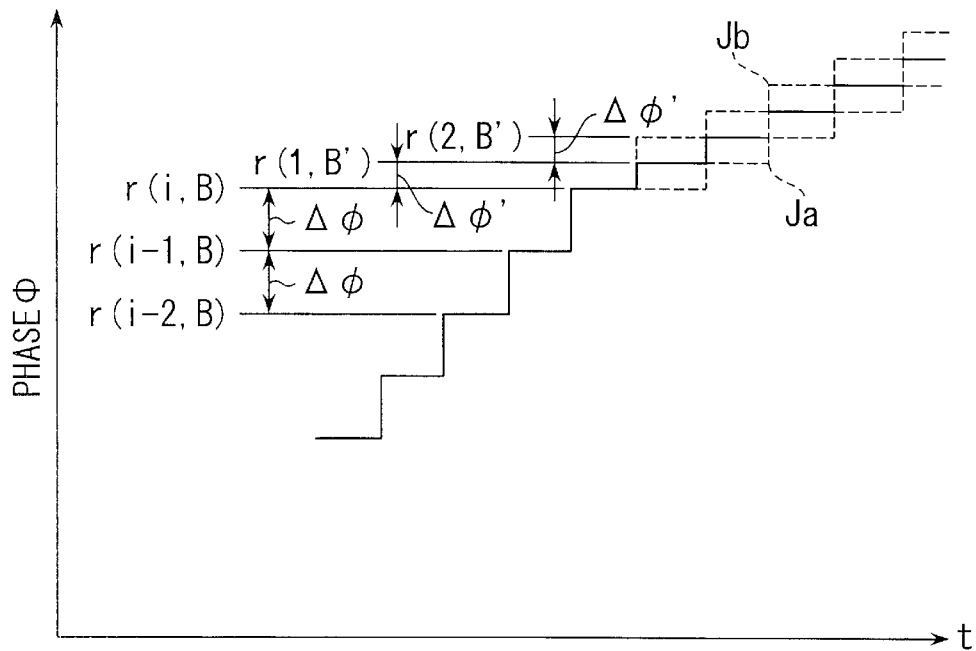
FIG. 13 is a view illustrating an operation of the frequency synthesizer shown in FIG. 11.
Figure 14:
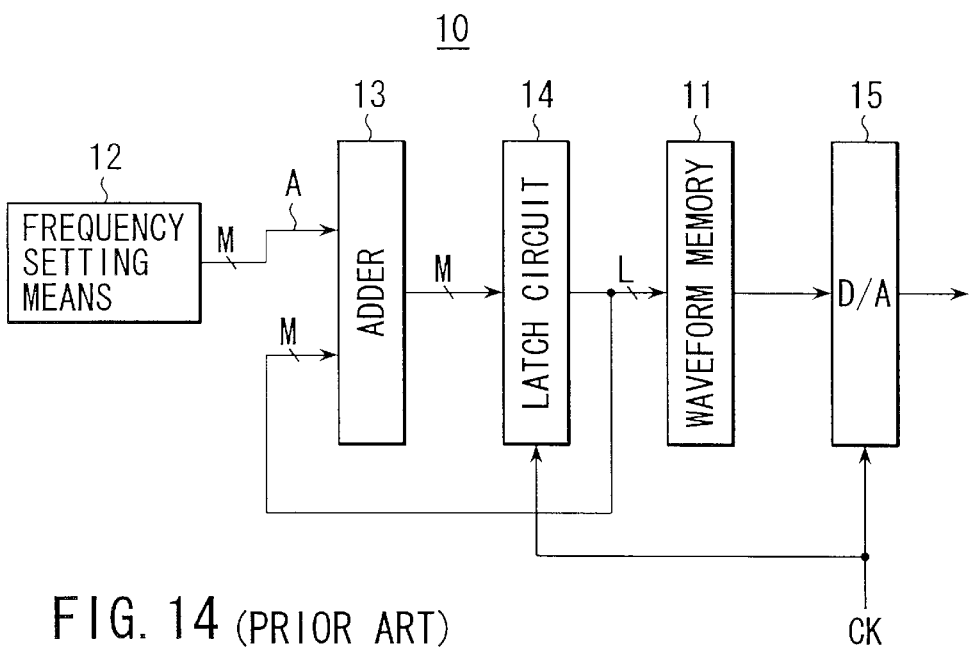
FIG. 14 is a block diagram depicting a configuration of a conventional device.

That is, as shown in FIG. 13, L-bit data 'r' (N, B) inputted to the waveform memory 21 is updated by predetermined intervals Δϕ that is determined depending on the frequency data B every time the clock signal CK has been inputted by one clock, whereby the amplitude data D (r) of the address (phase) specified by the data 'r' (N, B) are sequentially outputted.

Here, when the count output N of the counter 24 is changed to time 't0' of 'i', and frequency data is changed to B' smaller than B, for example, by the frequency setting means 23, a set signal SET is outputted from the control circuit 83 to the counter 24 during input of the next clock 't1', as shown in FIG. 12C, whereby the count result N of the counter 24 is initialized to 1 as shown in FIG. 12B.

Therefore, the quantized data 'q' (1, B') relevant to the count result 1 is outputted from the shifting/adding circuit 30 during 't2' that is delayed by the number of clocks according to the number of the addition steps following the quantizing data 'q' (i, B) at the previous stage, as shown in FIG. 12D.

In addition, during this 't2', a latch signal LH is outputted from the control circuit 83 to the latch circuit 82, as shown in FIG. 12E, whereby an output R (j+1) of the latch circuit 82 is updated to a value equal to L-bit data 'r' (i, B) inputted to the waveform memory 21 at the previous stage.

Because of this, from the adding circuit 81, the least significant L-bit data 'r' (1, B') of 'r' (i, B)+q (1, B') is outputted, as shown in FIG. 12G.

Every time the subsequent clock signal CK is inputted by one clock, the data 'r' (2, B'), r (3, B'), . . . of the least significant L bits of r (i, B)+q (2, B'), r (i, B)+q (3, B') . . . are outputted from the adding circuit 81, as shown in FIG. 12G.

The first data 'r' (1, B') relevant to frequency data B' is represented in L bits by adding quantized data 'q' (1, B') to the last data 'r' (i, B) relevant to frequency data B.

In addition, the quantized data 'q' (1, B') indicates an address interval Δϕ' for reading out amplitude data by using frequency data B'.

Therefore, according to this frequency synthesizer 80, as shown in FIG. 13, the phase of amplitude data relevant to frequency data B' increases with intervals Δϕ' when the last phase 'r' (i, B) of the amplitude data outputted by frequency data B is defined as an initial phase. Thus, phase discontinuation due to a change in frequency data does not occur, and noise caused by this phase discontinuation is not generated.

In addition, according to this frequency synthesizer 80, as in the frequency synthesizer 20, even in the case where a large number of frequency data bits are set, an amplitude data phase can be specified within a delay time shorter than that in a conventional DDS system, and a high frequency resolution can be achieved without reducing a clock frequency.

Here, although the counter 24 is initialized to 1, even in the case where the counter 24 is initialized to 1 or its proximity, the level of noise generated by phase discontinuation can be reduced.

For example, in the case where the count output N of the counter 24 is initialized to 0, the quantized data 'q' (0, B') first obtained relevant to frequency data B' is set to 0, and an output of the adding circuit 81 is equal to an output at the previous stage. Thus, the same amplitude data is continuously outputted twice, as indicated by Ja in FIG. 13.

In the case where the count output N of the counter 24 is initialized to 2, the quantized data first obtained relevant to frequency data B' is 'q' (2, B'). Thus, the first amplitude data of frequency data B' increases by 2Δϕ' relevant to the phase of the last amplitude data of frequency data B, as indicated by Jb in FIG. 13.

In this manner, in the case where a value to be initialized is set to be a value close to 1, complete phase continuity is lost. However, its phase difference is small, and the level of the generated noise is small.

In addition, in the case of this frequency synthesizer 80 as well, as described with respect to the frequency synthesizer 20, predetermined approximation computation is performed for L-bit data instead of the waveform memory 21, whereby there may be employed amplitude data output means for outputting amplitude data with a periodic function.

As has been described above, a frequency synthesizer according to one aspect of the present embodiment comprises: amplitude data output means for, when L-bit data is received, outputting amplitude data with a predetermined periodic function of a phase specified by the data; frequency setting means for setting frequency data of (K+L−1) bits obtained by dividing a desired output frequency by a frequency of a predetermined clock signal; a K-bit counter for counting the clock signal; an L-set product and sum computation circuit for dividing frequency data of (K+L−1) bits from the frequency setting means into L-set K-bit data, and computing a logical product between a count output of K bits of the counter and a unit of bits, thereby obtaining a total number of bits in which the calculation result is 1 by each set; and a shifting/adding circuit for adding each total number data obtained by the L-set product and sum computation circuit by shifting bits, and outputting the least significant L bits of the addition result to the amplitude data output means, whereby, even if a large number of frequency data bits are set, the phase of amplitude data can be specified with a delay time shorter than that in a conventional DDS system, and a high frequency resolution can be achieved without reducing a clock frequency.

In addition, a frequency synthesizer according to another aspect of the present invention comprises: amplitude data output means for, when L-bit data is received, outputting amplitude data with a predetermined periodic function of a phase specified by the data; frequency setting means for setting frequency data of (K+L−1) bits obtained by dividing a desired output frequency by a frequency of a predetermined clock signal; a K-bit counter for counting the clock signal; an L-set product and sum computation circuit for dividing frequency data of (K+L−1) bits from the frequency setting means into L-set K-bit data, and computing a logical product between a count output of K bits of the counter and a unit of bits, thereby obtaining a total number of bits in which the calculation result is 1 by each set; a shifting/adding circuit for adding each total number data obtained by the L-set product and sum computation circuit by shifting bits, and outputting the least significant L bits of the addition result to the amplitude data output means; a latch circuit for latching L-bit data inputted to the amplitude data output mean every time the latch circuit receives a latch signal; an adding circuit for adding an output of the shifting/adding circuit and an output the latch circuit, and outputting the least significant L bits of the addition result to the amplitude data output means; and a control circuit for initializing the counter to a value 1 or a value close thereto every time frequency data set by the frequency setting means is changed, and outputting a latch signal to the latch circuit in accordance with a timing at which L-bit data corresponding to the initialized value is outputted from the shift adder, thereby substantially making continuous a phase value immediately before frequency change of amplitude data outputted from the amplitude data output means and a phase value after frequency change, whereby, even if a large number of frequency data bits are set, the phase of amplitude data can be specified with a delay time shorter than that in a conventional DDS system; a high frequency resolution can be achieved and moreover, the generation of noise due to phase discontinuation during frequency change can be restricted.

Furthermore a Gaussian noise generator according to still another aspect of the present invention comprises: a sine wave generation portion for generating a plurality of sine waves having different frequencies; and a Gaussian noise generation portion for adding and synthesizing a plurality of sine waves generated by the sine wave generation portion, thereby generating a Gaussian noise signal, wherein the sine wave generation portion comprises: amplitude data output means for receiving L-bit data, and outputting amplitude data of a sine wave function of a phase specified by the data; frequency setting means for setting frequency data of (K+L−1) bits obtained by dividing a frequency selected from among geometrical series in which an 'u'-order algebraic integer relevant to an integer 'u' greater than the number of sine waves is defined as a common rate: a K-bit counter for counting the clock signal; an L-set product and sum computation circuit for dividing frequency data of (K+L−1) bits from the frequency setting means into L-set K-bit data, and computing a logical product between a count output of K bits of the counter and a unit of bits, thereby obtaining a total number of bits in which the calculation result is 1 by each set; and a shifting/adding circuit for adding each total number data obtained by the L-set product and sum computation circuit by shifting bits, and outputting the least significant L bits of the addition result to the amplitude data output means, the sine wave generation portion being constructed so as to generate sine waves of a plurality of frequencies selected without being duplicated from among a geometrical series in which the 'u'-order algebraic integer is defined as a common rate, wherein the Gaussian noise generator is configured so as to generate sine waves of a plurality of frequencies selected without any duplication from among a geometrical series in which a u-order algebraic integer is defined as a common rate, whereby a Gaussian noise signal with its high precision, the amplitude of which is very close to a Gaussian distribution, can be generated.

Therefore, according to the present invention as described above, there can be provided a frequency synthesizer that solves the above described problems with prior art, the frequency synthesizer being capable of achieving a high frequency resolution; and a Gaussian noise generator using the same.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A frequency synthesizer comprising:

amplitude data output means for, when L-bit data is received, outputting amplitude data with a predetermined periodic function of a phase specified by the data;

frequency setting means for setting frequency data of (K+L−1) bits obtained by dividing a desired output frequency by a frequency of a predetermined clock signal;

a K-bit counter for counting the clock signal;

L-set product and sum computation circuits for subjecting frequency data of (K+L−1) bits from the frequency setting means into L-set K-bit data in which a start bit is shifted by one bit each other, and computing a logical product between a count output of K bits from the counter and a unit of bits, thereby obtaining a total number of bits in which the calculation result is 1 by each set; and a shifting/adding circuit for adding each total number data obtained by the L-set product and sum computation circuits by shifting bits, and outputting the least significant L bits of the addition result to the amplitude data output means.

2. A frequency synthesizer according to claim 1, wherein each of the L-set product and sum computation circuits comprises K AND circuits and an adder for adding outputs from the K AND circuits, respectively, a logical product in units of bits between the L-set K bit data and the count output N of K bits from the counter is computed by means of the K AND circuits in order to process frequency data B of (K+L−1) bits from the frequency setting means to be divided into L-set K-bit data ($b_1$ to $b_k$), ($b_2$ to $b_{K+1}$), ..., ($b_{L-1}$ to $b_{L+K-2}$), and ($b_L$ to $b_{L+K-1}$) when the start data are shifted each other by one bit, and then, a total number $v_j$ of bits is obtained by the adder for each set when the computation result is 1.

3. A frequency synthesizer according to claim 1, wherein the shifting/adding circuit is configured by cascade connecting L shift adders; a shift adder of a first step adds total number data $v_0$ and data obtained by shifting total number data $v_1$ to a high order side by one bit (data obtained by adding 0 to a low order by one bit) to each other; a shift adder of a second step adds an output of the shift adder of the first step and data obtained by shifting total number data $v_2$ to a high order side by 2 bits to each other, and similarly, shift addition of total number data $v_j$ is performed by the shift adder of each step, thereby outputting quantized data 'q' quantized from the shift adder of the last step in L bits.

4. A frequency synthesizer according to claim 1, wherein the shifting/adding circuit is composed of L/2 shift adders in a parallel relationship and R-1 (provided if R=L/2) shift adders in a serial relationship; the total number data 'v' is shift-added by means of the L/2 shift adders by two sets in order to process the total number data 'v', and then, each of these outputs is shift-added by the R-1 shift adders, thereby outputting L-bit quantized data 'q'.

5. A frequency synthesizer according to claim 1, wherein the amplitude data output means includes a waveform memory, amplitude data of an arbitrary periodic function including a sine wave function is stored in a region that can be specified by an L-bit address signal in order of addresses by one cycle, whereby the waveform memory outputs amplitude data stored in an address (phase) specified by the address signal.

6. A frequency synthesizer according to claim 5, wherein the amplitude data output means includes a D/A converter for sequentially converting amplitude data outputted from the waveform memory into an analog voltage signal, and outputting the converted signal.

7. A frequency synthesizer, comprising:

amplitude data output means for, when L-bit data is received, outputting amplitude data with a predetermined periodic function of a phase specified by the data;

frequency setting means for setting frequency data of (K+L−1) bits obtained by dividing a desired output frequency by a frequency of a predetermined clock signal;

a K-bit counter for counting the clock signal;

L-set product and sum computation circuits for subjecting frequency data of (K+L−1) bits from the frequency setting means into L-set K-bit data in which a start bit is shifted by one bit each other, and computing a logical product between a count output of K bits from the counter and a unit of bits, thereby obtaining a total number of bits in which the calculation result is 1 by each set;

a shifting/adding circuit for adding each total number data obtained by the L-set product and sum computation circuits by shifting bits, and outputting the least significant L bits of the addition result to the amplitude data output means;

a latch circuit for latching L-bit data inputted to the amplitude data output mean every time the latch circuit receives a latch signal;

an adding circuit for adding an output of the shifting/adding circuit and an output the latch circuit, and outputting the least significant L bits of the addition result to the amplitude data output means; and a control circuit for initializing the counter to a value 1 or a value close thereto every time frequency data set by the frequency setting means is changed, and outputting a latch signal to the latch circuit in accordance with a timing at which L-bit data corresponding to the initialized value is outputted from the shifting adding circuit, thereby substantially making continuous a phase value immediately before frequency change of amplitude data outputted from the amplitude data output means and a phase value after frequency change.

8. A frequency synthesizer according to claim 7, wherein each of the L-set product and sum computation circuits comprises K AND circuits and an adder for adding outputs from the K AND circuits, respectively, a logical product in units of bits between the L-set K bit data and the count output N of K bits from the counter is computed by means of the K AND circuits in order to process frequency data B of (K+L−1) bits from the frequency setting means to be divided into L-set K-bit data ($b_1$ to $b_k$), ($b_2$ to $b_{K+1}$), ..., ($b_{L-1}$ to $b_{L+K-2}$), and ($b_L$ to $b_{L+K-1}$) when the start data are shifted each other by one bit, and then, a total number $v_j$ of bits is obtained by the adder for each set when the computation result is 1.

9. A frequency synthesizer according to claim 7, wherein the shifting/adding circuit is configured by cascade connecting L shift adders; a shift adder of a first step adds total number data $v_0$ and data obtained by shifting total number data $v_1$ to a high order side by one bit (data obtained by adding 0 to a low order by one bit) to each other; a shift adder of a second step adds an output of the shift adder of the first step and data obtained by shifting total number data $v_2$ to a high order side by 2 bits to each other, and similarly, shift addition of total number data $v_j$ is performed by the shift adder of each step, thereby outputting quantized data 'q' quantized from the shift adder of the last step in L bits.

10. A frequency synthesizer according to claim 7, wherein the shifting/adding circuit is composed of L/2 shift adders in a parallel relationship and R-1 (provided if R=L/2) shift adders in a serial relationship; the total number data 'v' is shift-added by means of the L/2 shift adders by two sets in order to process the total number data 'v', and then, each of these outputs is shift-added by the R-1 shift adders, thereby outputting L-bit quantized data 'q'.

11. A frequency synthesizer according to claim 7, wherein the amplitude data output means includes a waveform memory, amplitude data of an arbitrary periodic function including a sine wave function is stored in a region that can be specified by an L-bit address signal in order of addresses by one cycle, whereby the waveform memory outputs amplitude data stored in an address (phase) specified by the address signal.

12. A frequency synthesizer according to claim 5, wherein the amplitude data output means includes a D/A converter for sequentially converting amplitude data outputted from the waveform memory into an analog voltage signal, and outputting the converted signal.

13. A Gaussian noise generator, comprising:
a sine wave generation portion for generating a plurality of sine waves having different frequencies; and
a Gaussian noise generation portion for adding and synthesizing a plurality of sine waves generated by the sine wave generation portion, thereby generating a Gaussian noise signal, wherein the sine wave generation portion comprises:
amplitude data output means for receiving L-bit data, and outputting amplitude data of a sine wave function of a phase specified by the data;
frequency setting means for setting frequency data of (K+L−1) bits obtained by dividing a frequency selected from among geometrical series in which an 'u'-order algebraic integer relevant to an integer 'u' greater than the number of sine waves is defined as a common rate:
a K-bit counter for counting the clock signal;
L-set product and sum computation circuits for subjecting frequency data of (K+L−1) bits from the frequency setting means into L-set K-bit data in which a start bit is shifted by one bit each other, and computing a logical product between a count output of K bits from the counter and a unit of bits, thereby obtaining a total number of bits in which the calculation result is 1 by each set; and
a shifting/adding circuit for adding each total number data obtained by the L-set product and sum computation circuits by shifting bits, and outputting the least significant L bits of the addition result to the amplitude data output means, the sine wave generation portion being constructed so as to generate sine waves of a plurality of frequencies selected without being duplicated from among a geometrical series in which the 'u'-order algebraic integer is defined as a common rate.

14. A Gaussian noise generator according to claim 13, wherein each of the L-set product and sum computation circuits comprises K AND circuits and an adder for adding outputs from the K AND circuits, respectively, a logical product in units of bits between the L-set K bit data and the count output N of K bits from the counter is computed by means of the K AND circuits in order to process frequency data B of (K+L−1) bits from the frequency setting means to be divided into L-set K-bit data ($b_1$ to $b_k$), ($b_2$ to $b_{K+1}$), ..., ($b_{L-1}$ to $b_{L+K-2}$), and ($b_L$ to $b_{L+K-1}$) when the start data are shifted each other by one bit, and then, a total number $v_j$ of bits is obtained by the adder for each set when the computation result is 1.

15. A Gaussian noise generator according to claim 13, wherein the shifting/adding circuit is configured by cascade connecting L shift adders; a shift adder of a first step adds total number data $v_0$ and data obtained by shifting total number data $v_1$ to a high order side by one bit (data obtained by adding 0 to a low order by one bit) to each other; a shift adder of a second step adds an output of the shift adder of the first step and data obtained by shifting total number data $v_2$ to a high order side by 2 bits to each other, and similarly, shift addition of total number data $v_j$ is performed by the shift adder of each step, thereby outputting quantized data 'q' quantized from the shift adder of the last step in L bits.

16. A Gaussian noise generator according to claim 13, wherein the shifting/adding circuit is composed of L/2 shift adders in a parallel relationship and R-1 (provided if R=L/2) shift adders in a serial relationship; the total number data 'v' is shift-added by means of the L/2 shift adders by two sets in order to process the total number data 'v', and then, each of these outputs is shift-added by the R-1 shift adders, thereby outputting L-bit quantized data 'q'.

17. A frequency synthesizer according to claim 13, wherein the amplitude data output means includes a waveform memory, amplitude data of an arbitrary periodic function including a sine wave function is stored in a region that can be specified by an L-bit address signal in order of addresses by one cycle, whereby the waveform memory outputs amplitude data stored in an address (phase) specified by the address signal.

18. A frequency synthesizer according to claim 17, wherein the amplitude data output means includes a D/A converter for sequentially converting amplitude data outputted from the waveform memory into an analog voltage signal, and outputting the converted signal.

19. A Gaussian noise generator, comprising:
a sine wave generation portion for generating a plurality of sine waves with their different frequencies; and
a Gaussian noise generation portion for adding and synthesizing a plurality of sine waves generated by the sine wave generation portion, thereby generating a Gaussian noise signal, wherein said sine wave generation portion comprises:
a waveform memory having amplitude data of an arbitrary periodic function that include a sine wave function stored in order of addresses by one cycle in a region that an be specified by an L-bit address signal, thereby outputting amplitude data stored in an address (phase) specified by the address signal;
a frequency data memory that stores frequency data $B_1$ to $B_W$ (K+L−1 bits) of the plurality of sine waves in advance in order of addresses;
a coefficient data memory that stores coefficients S1 to SW in advance in order of addresses;
an address counter composed of (W+1) notation counters for reading out data in order from the frequency data memory and the coefficient data memory, the counter counting a clock signal CK' of a frequency that is (W+1) times of a clock frequency 'fc', and specifying an address of the frequency data memory and coefficient data memory according to a count output until the clock signal CK' has been inputted by one to W clocks, whereby the frequency data $B_1$ to $B_W$ and the coefficient $S_1$ to $S_W$ are read out one by one in synchronism with the clock signal CK', the counter outputting a clock signal CK by one clock when a W+1 clock is inputted;
a counter for counting the clock signal CK outputted from the address counter;
a multiplication/quantization circuit in which K-bit count output N caused by the counter is inputted, the multiplication/quantization circuit performing multiplication and quantization between the count output N of the counter and frequency data $B_1$ to $B_W$ of K+L−1 bits sequentially outputted from the frequency data memory, whereby L-bit quantized data $q_1$ to $q_W$ relevant to the same count output N are sequentially outputted as an address signal to the waveform memory;
a multiplier for inputting an address signal from the multiplication/quantization circuit to the waveform memory, and sequentially inputting amplitude data $D_1$ to $D_W$ specified by the quantized data $q_1$ to $q_W$ read out from the waveform memory in synchronism with the clock signal CK', thereby multiplying each of the amplitude data $D_1$ to $D_W$ by a respective one of coefficients $S_1$ to $S_W$ sequentially read out from the coefficient data memory in synchronism with the clock signal CK';

an adder to which the multiplication results $S_1 \cdot D_1$ to $S_W \cdot D_W$ caused by the multiplier are sequentially inputted;

a first latch circuit for latching an output from the adder in synchronism with the clock signal CK', and returning the latch to the adder to be add to the multiplication result $S_1 \cdot D_1$ to $S_W \cdot D_W$ caused by the multiplier, whereby, when the count result of the address counter reaches W, a sum of the multiplication results $S_1 \cdot D_1$ to $S_W \cdot D_W$ of each frequency obtained with respect to one of the count results N of the counter is stored, the first latch circuit resetting the storage contents upon receipt of the clock signal CK; and a second latch circuit for, when the clock signal CK is received, latching data latched by the first latch circuit, thereby outputting the latch data as noise signal data Ng, and wherein the Gaussian noise generator in which, after amplitude data of one frequency is generated every time the count value of the address counter advances stepwise by one, whereby the count value of the address counter advances stepwise by W, W types of amplitude data are obtained one by one, noise signal data obtained by adding these is outputted, and an operation that the count output N of the counter advances stepwise by one is repeated, thereby generating a Gaussian noise signal.

20. A Gaussian noise signal according to claim 19, wherein the multiplication/quantization circuit comprises:

L-set product and sum computation circuits for subjecting frequency data of each (K+L−1) bit from the frequency data memory into L-set K-bit data in which a start bit is shifted by 1 bit each other, and computing a logical product between a K-bit count output from the counter and a bit unit, thereby obtaining a total number of bits for each set when the computation result is 1; and a shifting/adding circuit for adding each total number data obtained by the L-set product and sum computation circuits by shifting a bit, thereby outputting the least significant L bits of the addition result to the waveform memory.

21. A Gaussian noise generator according to claim 20, wherein each of the L-set product and sum computation circuits comprises K AND circuits and an adder for adding outputs from the K AND circuits, respectively, a logical product in units of bits between the L-set K bit data and the count output N of K bits from the counter is computed by means of the K AND circuits in order to process frequency data B of (K+L−1) bits from the frequency setting means to be divided into L-set K-bit data $(b_1$ to $b_K)$, $(b_2$ to $b_{K+1})$, ..., $(b_{L-1}$ to $b_{L+K-2})$, and $(b_L$ to $b_{L+K-1})$ when the start data are shifted each other by one bit, and then, a total number $v_j$ of bits is obtained by the adder for each set when the computation result is 1.

22. A Gaussian noise generator according to claim 20, wherein the shifting/adding circuit is configured by cascade connecting L shift adders; a shift adder of a first step adds total number data $v_0$ and data obtained by shifting total number data $v_1$ to a high order side by one bit (data obtained by adding 0 to a low order by one bit) to each other; a shift adder of a second step adds an output of the shift adder of the first step and data obtained by shifting total number data $v_2$ to a high order side by 2 bits to each other, and similarly, shift addition of total number data $v_j$ is performed by the shift adder of each step, thereby outputting quantized data 'q' quantized from the shift adder of the last step in L bits.

23. A Gaussian noise generator according to claim 20, wherein the shifting/adding circuit is composed of L/2 shift adders in a parallel relationship and R−1 (provided if R=L/2) shift adders in a serial relationship; the total number data 'v' is shift-added by means of the L/2 shift adders by two sets in order to process the total number data 'v', and then, each of these outputs is shift-added by the R−1 shift adders, thereby outputting L-bit quantized data 'q'.

24. A Gaussian noise generator, comprising:

a sine wave generation portion for generating a plurality of sine waves with their different frequencies; and a Gaussian noise generation portion for adding and synthesizing a plurality of sine waves generated by the sine wave generation portion, thereby generating a Gaussian noise signal, wherein said sine wave generation portion comprises:

first and second waveform memories each having amplitude data of an arbitrary periodic function that include a sine wave function stored in order of addresses by one cycle in a region that an be specified by an L-bit address signal, thereby outputting amplitude data stored in an address (phase) specified by the address signal;

a frequency data memory that stores frequency data $B_1$ to $B_W$ (K+L−1 bits) of the plurality of sine waves in advance in order of addresses;

a coefficient data memory that stores coefficients S1 to SW in advance in order of addresses;

an address counter composed of (W+1) notation counters for reading out data in order from the frequency data memory and the coefficient data memory, the counter counting a clock signal CK' of a frequency that is (W+1) times of a clock frequency 'fc', and specifying an address of the frequency data memory and coefficient data memory according to a count output until the clock signal CK' has been inputted by one to W clocks, whereby the frequency data $B_1$ to $B_{W/2}$ and $B_{1+W/2}$ to $B_W$ and the coefficient $S_1$ to $S_{W/2}$ and $S_{1+W/2}$ to $S_W$ are read out one by one in synchronism with the clock signal CK', the counter outputting a clock signal CK by one clock when a 1+(W/2) clock is inputted;

a counter for counting the clock signal CK outputted from the address counter;

first and second multiplication/quantization circuits to which K-bit count output N caused by the counter is inputted, the multiplication/quantization circuits performing multiplication and quantization between the count output N of the counter and frequency data $B_1$ to $B_{W/2}$ and $B_{1+W/2}$ to $B_W$ sequentially outputted from the frequency data memory respectively, whereby L-bit quantized data $q_1$ to $q_{W/2}$ and $q_{1+W/2}$ to $q_W$ relevant to the same count output N are sequentially outputted as address signals to the first and second waveform memories;

first and second multipliers for inputting address signals from the first and second multiplication/quantization circuits to the first and second waveform memories, and sequentially inputting amplitude data $D_1$ to $D_W$ specified by the quantized data $q_1$ to $q_{W/2}$ and $q_{1+W/2}$ to $q_W$ read out from the first and second waveform memories in synchronism with the clock signal CK', thereby multiplying each of the amplitude data $D_1$ to $D_{W/2}$ and $D_{1+W/2}$ to $D_W$ by a respective one of coefficients $S_1$ to $S_{W/2}$ and $S_{1+W/2}$ to $S_{WW}$ sequentially read out from the coefficient data memory in synchronism with the clock signal 'CK';

a first adder to which the multiplication results $S_1 \cdot D_1$ to $S_W \cdot D_W$ caused by the first and second multipliers are sequentially inputted;

a second adder for adding an output from the first adder;

a first latch circuit for latching an output from the second adder in synchronism with the clock signal CK', and returning the latch to the second adder to be add to the multiplication result $S_1 \cdot D_1$ to $S_W \cdot D_W$ caused by the first and second multipliers, whereby, when the count result of the address counter reaches W, a sum of the multiplication results $S_1 \cdot D_1$ to $S_W \cdot D_W$ of each frequency obtained with respect to one of the count results N of the counter is stored, the first latch circuit resetting the storage contents upon receipt of the clock signal CK; and a second latch circuit for, when the clock signal CK is received, latching data latched by the first latch circuit, thereby outputting the latch data as noise signal data Ng, and wherein the Gaussian noise generator in which, after amplitude data of two different frequencies are generated every time the count value of the address counter advances stepwise up to W/2, whereby the count value of the address counter advances stepwise by W, W types of amplitude data are obtained one by one, noise signal data obtained by adding these is outputted, and an operation that the count output N of the counter advances stepwise by one is repeated, thereby generating a Gaussian noise signal.

25. A Gaussian noise signal according to claim 24, wherein each of the first and multiplication/quantization circuits comprises:

L-set product and sum computation circuits for subjecting frequency data of each (K+L−1) bit from the frequency data memory into L-set K-bit data in which a start bit is shifted by 1 bit each other, and computing a logical product between a K-bit count output from the counter and a bit unit, thereby obtaining a total number of bits for each set when the computation result is 1; and a shifting/adding circuit for adding each total number data obtained by the L-set product and sum computation circuits by shifting a bit, thereby outputting the least significant L bits of the addition result to each of the first and waveform memories.

26. A Gaussian noise generator according to claim 25, wherein each of the L-set product and sum computation circuits comprises K AND circuits and adder for adding outputs from the K AND circuits, respectively, a logical product in units of bits between the L-set K bit data and the count output N of K bits from the counter is computed by means of the K AND circuits in order to process frequency data B of (K+L−1) bits from the frequency setting means to be divided into L-set K-bit data ($b_1$ to $b_K$), ($b_2$ to $b_{K+1}$), ..., ($b_{L-1}$ to $b_{L+K-2}$), and ($b_L$ to $b_{L+K-1}$) when the start data are shifted each other by one bit, and then, a total number $v_j$ of bits is obtained by the adder for each set when the computation result is 1.

27. A Gaussian noise generator according to claim 25, wherein the shifting/adding circuit is configured by cascade connecting L shift adders; a shift adder of a first step adds total number data $v_0$ and data obtained by shifting total number data $v_1$ to a high order side by one bit (data obtained by adding 0 to a low order by one bit) to each other; a shift adder of a second step adds an output of the shift adder of the first step and data obtained by shifting total number data $v_2$ to a high order side by 2 bits to each other, and similarly, shift addition of total number data $v_j$ is performed by the shift adder of each step, thereby outputting quantized data 'q' quantized from the shift adder of the last step in L bits.

28. A Gaussian noise generator according to claim 25, wherein the shifting/adding circuit is composed of L/2 shift adders in a parallel relationship and R−1 (provided if R=L/2) shift adders in a serial relationship; the total number data 'v' is shift-added by means of the L/2 shift adders by two sets in order to process the total number data 'v', and then, each of these outputs is shift-added by the R−1 shift adders, thereby outputting L-bit quantized data 'q'.

29. A Gaussian noise generator, comprising:

a sine wave generation portion for generating a plurality of sine waves with their different frequencies; and a Gaussian noise generation portion for adding and synthesizing a plurality of sine waves generated by the sine wave generation portion, thereby generating a Gaussian noise signal, wherein the sine wave generation portion comprises:

amplitude data output means for, when L-bit data is received, outputting amplitude data of a sine wave function of a phase specified by the data;

frequency setting means for setting frequency data of (K+L−1) bits obtained by dividing a frequency selected from among a geometrical series in which a u-order algebraic integer relevant to an integer 'u' greater than the number of the sine waves is defined as a common rate by a predetermined clock signal;

a K-bit counter for counting the clock signal;

L-set product and sum computation circuits for subjecting frequency data of (K+L−1) bits from the frequency setting means into L-set K-bit data in which a start bit is shifted by one bit each other, and computing a logical product between the count output of K bits of the counter and a bit unit, thereby obtaining a total number of bits for each set when the computation result is 1; and a shifting/adding circuit for adding each total number data obtained by the L-set product and sum computation circuits by shifting a bit, and outputting the least significant L bits of the computation result to the amplitude data output means, the sine wave generation portion being constructed so as to generate sine waves of a plurality of frequencies selected without any duplication from among a geometrical series in which the u-order algebraic integer is defined as a common rate.

\* \* \* \* \*